US010961388B2

(12) United States Patent
Soyama et al.

(10) Patent No.: US 10,961,388 B2
(45) Date of Patent: Mar. 30, 2021

(54) POLYLACTIC ACID RESIN COMPOSITION AND POLYESTER RESIN COMPOSITION, AND METHOD FOR PRODUCING THE SAME AND MOLDED BODY THEREOF

(71) Applicant: NEC CORPORATION, Tokyo (JP)

(72) Inventors: Makoto Soyama, Tokyo (JP); Masatoshi Iji, Tokyo (JP); Shukichi Tanaka, Tokyo (JP); Kiyohiko Toyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 326 days.

(21) Appl. No.: 15/780,760

(22) PCT Filed: Dec. 2, 2016

(86) PCT No.: PCT/JP2016/085958
§ 371 (c)(1),
(2) Date: Jun. 1, 2018

(87) PCT Pub. No.: WO2017/094901
PCT Pub. Date: Jun. 8, 2017

(65) Prior Publication Data
US 2020/0263028 A1 Aug. 20, 2020

(30) Foreign Application Priority Data

Dec. 4, 2015 (JP) .............................. JP2015-238042
Oct. 24, 2016 (JP) .............................. JP2016-207913
Nov. 22, 2016 (JP) .............................. JP2016-226736

(51) Int. Cl.
C08L 67/04 (2006.01)
C08G 77/18 (2006.01)
C08G 77/26 (2006.01)
C08G 77/44 (2006.01)
C08G 77/445 (2006.01)
C08G 63/695 (2006.01)
C08L 67/00 (2006.01)
C08K 7/14 (2006.01)
C08K 9/06 (2006.01)
C08K 5/29 (2006.01)
C08L 101/16 (2006.01)

(52) U.S. Cl.
CPC .......... C08L 67/04 (2013.01); C08G 63/6952 (2013.01); C08G 77/18 (2013.01); C08G 77/26 (2013.01); C08G 77/44 (2013.01); C08G 77/445 (2013.01); C08K 5/29 (2013.01); C08K 7/14 (2013.01); C08K 9/06 (2013.01); C08L 67/00 (2013.01); C08L 101/16 (2013.01); C08L 2205/025 (2013.01); C08L 2205/035 (2013.01)

(58) Field of Classification Search
CPC ............... C08L 67/04; C08L 2205/025; C08L 2205/035; C08L 67/00; C08L 101/16; C08G 77/445; C08G 77/44; C08G 77/18; C08G 77/26; C08G 63/6952; C08K 5/29; C08K 7/14; C08K 9/06
See application file for complete search history.

(56) References Cited

U.S. PATENT DOCUMENTS

| | | |
|---|---|---|
| 2006/0100313 A1 | 5/2006 | Tanaka et al. |
| 2007/0142503 A1 | 6/2007 | Yamada et al. |
| 2007/0203287 A1 | 8/2007 | Tanaka et al. |
| 2011/0060080 A1 | 3/2011 | Kishimoto et al. |
| 2013/0005872 A1 | 1/2013 | Kiuchi et al. |
| 2013/0012631 A1 | 1/2013 | Serizawa et al. |
| 2014/0155528 A1 | 6/2014 | Onoue et al. |
| 2018/0346713 A1* | 12/2018 | Soyama ................ C08K 5/521 |

FOREIGN PATENT DOCUMENTS

| | | |
|---|---|---|
| CN | 1681884 A | 10/2005 |
| CN | 1867630 A | 11/2006 |
| CN | 1898324 A | 1/2007 |
| CN | 101065446 A | 10/2007 |
| CN | 101990565 A | 3/2011 |
| CN | 102812086 A | 12/2012 |
| CN | 102834458 A | 12/2012 |
| CN | 103635534 A | 3/2014 |
| EP | 0 980 894 A1 | 2/2000 |
| JP | 2002-309074 A | 10/2002 |
| JP | 2003-192929 A | 7/2003 |
| JP | 2004-277575 A | 10/2004 |
| JP | 2005-120118 A | 5/2005 |
| JP | 2006-089643 A | 4/2006 |
| JP | 2008-150560 A | 7/2008 |
| JP | 2009-161658 A | 7/2009 |
| JP | 2009-249521 A | 10/2009 |
| JP | 2009-270087 A | 11/2009 |
| JP | 2009-270089 A | 11/2009 |
| JP | 2009-293031 A | 12/2009 |
| JP | 2010-202845 A | 9/2010 |
| JP | 2010-202848 A | 9/2010 |
| JP | 2012-072351 A | 4/2012 |
| WO | 2004/022650 A1 | 3/2004 |
| WO | 2009/125872 A1 | 10/2009 |
| WO | 2010/004799 A1 | 1/2010 |
| WO | 2010/101291 A1 | 9/2010 |
| WO | 2012/029421 A1 | 3/2012 |
| WO | 2012/049896 A1 | 4/2012 |
| WO | 2013/001750 A1 | 1/2013 |

OTHER PUBLICATIONS

Extended European Search Report dated Jul. 5, 2019 issued by the European Patent Office in counterpart application No. 16870836.0.

(Continued)

Primary Examiner — Patrick D Niland
(74) Attorney, Agent, or Firm — Sughrue Mion, PLLC

(57) ABSTRACT

Resin compositions according to exemplary embodiments of the present invention are first compositions containing a polylactic acid resin, an aliphatic polyester resin, a surface-treated metal hydrate, and a carbodiimide compound, or second compositions containing a polysiloxane-mixed polyester resin, a phosphorus-containing flame retardant, a metal hydrate and a fluorine-containing polymer in specific ratios.

11 Claims, No Drawings

(56) References Cited

OTHER PUBLICATIONS

International Search Report of PCT/JP2016/085958 dated Feb. 21, 2017.
Communication dated Dec. 10, 2019, from The State Intellectual Property Office of the P.R. of China in Application No. 201680070976.3.

* cited by examiner

POLYLACTIC ACID RESIN COMPOSITION AND POLYESTER RESIN COMPOSITION, AND METHOD FOR PRODUCING THE SAME AND MOLDED BODY THEREOF

CROSS REFERENCE TO RELATED APPLICATIONS

This application is a National Stage of International Application No. PCT/JP2016/085958 filed Dec. 2, 2016, claiming priority based on Japanese Patent Application No. 2015-238042 filed Dec. 4, 2015, Japanese Patent Application No. 2016-207913 filed Oct. 24, 2016, and Japanese Patent Application No. 2016-226736 filed Nov. 22, 2016, the entire disclosures of which are incorporated herein by reference.

TECHNICAL FIELD

The present invention relates to a polylactic acid resin composition and a polyester resin composition, and a method for producing the same and a molded body thereof.

BACKGROUND ART

Thermoplastic resins represented by polyester are excellent in molding processability, rigidity and the like. Among these, polyhydroxycarboxylic acids including polylactic acids and polybutylene succinate resins have relatively excellent molding processability, toughness, rigidity and the like. Polyhydroxycarboxylic acids such as polylactic acids can be synthesized from natural raw materials such as corn; particularly polylactic acids, since having excellent molding processability, biodegradability and the like, are being developed as environmentally friendly resins in various fields.

Polylactic acids and polybutylene succinate resins, however, generally easily burn; and for example, in the case of being used in applications requiring high flame retardancy, such as housings of household appliances and OA devices, and car trim parts, flame-retarding measures are needed.

For example, in the case of using polylactic acid resins for housings of electric appliances, the resins need to meet flame retardancy standards such as UL Standard of the US.

Further, since polylactic acids are inferior in impact resistance and flexibility to bending breaking strain and the like to resins, such as ABS resins, using petroleums as raw materials, while the polylactic acids have excellent physical properties, it is difficult to use the polylactic acids for outer packaging materials for electric and electronic devices, car trim parts, and the like, which all require high impact resistance.

Patent Literature 1 describes a biodegradable resin composition containing a polylactic acid and a silicone-lactic acid copolymer for the purpose of improving impact resistance, flame retardancy and the like. The biodegradable resin composition, however, is complex in the fabrication process of the silicone-lactic acid copolymer. Further the biodegradable resin composition, though having flame retardancy, is insufficient in impact resistance as compared with resins conventionally used in applications of electric and electronic devices, and is disadvantageous to be applied to articles of practical use.

Patent Literature 2 describes a polylactic acid resin composition containing a polylactic acid resin, a low-soda metal hydroxide surface-treated with a silane coupling agent, a plasticizer and a phosphorus compound for the purpose of improving impact resistance and flexibility. The resin composition, however, though having flame retardancy, in some cases, does not attain practicable levels in applications requiring high impact resistance.

Patent Literature 3 describes a resin composition containing a polylactic acid resin, a polycarbonate resin and an amino group-containing chain extender for the purpose of providing an environmentally friendly resin composition improved in heat resistance, mechanical strength, hydrolysis resistance and the like. It is described that target physical properties are attained by making the viscosity of the polylactic acid resin to be raised by the amino group-containing chain extender and controlling the morphology with the polycarbonate resin. The resin composition, however, inhibits the high flowability, which is a characteristic of polylactic acid resins, and is not suitable for thin wall molding. Further the resin composition is inferior in the environment friendliness, since the polycarbonate resin derived from petroleum is an essential component.

Patent Literature 4 discloses a polylactic acid resin composition composed of 80 to 40 parts by mass of a crosslinked polylactic acid resin (A), 20 to 60 parts by mass of a metal oxide and/or a metal hydroxide (B), and further a drip prevention agent (C) of 0.05 to 5 parts by mass to 100 parts by mass of the total of the components (A) and (B). It is further described that an object is to provide a resin composition and a molded body which have a larger flame retardancy improving effect than that of conventional resin compositions and simultaneously have excellent moldability and mechanical strength, and have low dependency on petroleum products.

Patent Literature 5 discloses a polylactic acid resin composition containing a polylactic acid resin and a metal hydrate surface-treated with an isocyanate-containing silane coupling agent, wherein the content of an alkali metal substance in the metal hydrate is 0.2% by mass or lower. It is further described that an object is to provide a polylactic acid resin composition and a molded body having excellent heat resistance and impact resistance, and further flexibility.

Patent Literature 6 discloses a polylactic acid resin composition containing a polylactic acid resin and a carbon fiber, wherein the polylactic acid resin has a segment of a polylactic acid compound and a segment of an amino group-containing polysiloxane compound having the amino group in its side chain, and the amino group is contained in the range of 0.01% by mass or higher and 2.5% by mass or lower on average with respect to the amino group-containing polysiloxane compound and in the range of 3 ppm by mass or higher and 300 ppm by mass or lower on average with respect to the polylactic acid compound. It is also described that an object is to provide a polylactic acid resin from which by a simple method, there can be produced molded articles, having an impact resistance equivalent to that of ABS resins and the like, having excellent flexibility to bending breaking strain and tensile breaking strain and having bleed resistance, usable as substitutes for ABS resins and the like in applications requiring high heat conductivity and impact resistance, and to provide a composition and a molded article using the polylactic acid resin and a production method.

CITATION LIST

Patent Literature

Patent Literature 1: JP2004-277575A
Patent Literature 2: WO2009/125872

Patent Literature 3: JP2009-293031A
Patent Literature 4: JP2008-150560A
Patent Literature 5: JP2009-270087A
Patent Literature 6: JP2010-202845A

SUMMARY OF INVENTION

Technical Problem

Then, a first object of the present invention is to provide a polylactic acid resin composition having high flame retardancy and excellent impact resistance and flexibility, and a molded body thereof.

With respect to a problem to be solved of polyester resin compositions, higher flame retardancy is required. Then, a second object of the present invention is to provide a polyester resin composition having high flame retardancy, and a molded body thereof.

Solution to Problem (First Means)
According to one aspect of the present invention,
there is provided a polylactic acid resin composition comprising a polylactic acid resin, an aliphatic polyester resin, a metal hydrate, and a carbodiimide compound,
wherein the metal hydrate is a metal hydrate surface-treated with an aminosilane coupling agent, a ureidosilane coupling agent, an isocyanate silane coupling agent or an epoxysilane coupling agent.

According to another aspect of the present invention, there is provided a molded body formed by using the above polylactic acid resin composition.

According to another aspect of the present invention, there is provided a method for producing a polylactic acid resin composition, the method comprising a step of mixing and stirring a mixture in a melt state comprising a polylactic acid compound, an aliphatic polyester resin, a carbodiimide compound, and a metal hydrate,
wherein the metal hydrate is a metal hydrate surface-treated with an aminosilane coupling agent, a ureidosilane coupling agent, an isocyanate silane coupling agent or an epoxysilane coupling agent.

In the above production method, it is preferable that an amino group-containing polysiloxane compound having an amino group in its side chain be further added and mixed and stirred.

The content of the amino group with respect to the amino group-containing polysiloxane compound is preferably in the range of 0.01% by mass to 2.5% by mass. The content of the amino group with respect to the polylactic acid compound is preferably in the range of 3 ppm by mass to 300 ppm by mass.

The addition amount (blend amount) of the amino group-containing polysiloxane compound is preferably in the range of 1.5% by mass to 5% by mass with respect to the polylactic acid resin composition.

(Second means)
According to one aspect of the present invention,
there is provided a polyester resin composition comprising a polysiloxane-mixed polyester resin (R) comprising a polyester compound (P) and an amino group-containing polysiloxane compound (C) mixed, a phosphorus-containing flame retardant (G), a metal hydrate (I), and a fluorine-containing polymer (J),
wherein the content of the polyester compound (P) is in the range of 30 to 65% by mass with respect to the polyester resin composition;
the content of the amino group-containing polysiloxane compound (C) is in the range of 1.5 to 10% by mass with respect to the polyester resin composition;
the content of the phosphorus-containing flame retardant (G) is in the range of 1 to 20% by mass with respect to the polyester resin composition;
the content of the metal hydrate (I) is in the range of 30 to 60% by mass with respect to the polyester resin composition; and the content of the fluorine-containing polymer (J) is in the range of 0.1 to 5% by mass with respect to the polyester resin composition.

According to another aspect of the present invention, there is provided a molded body formed by using the polyester resin composition.

According to another aspect of the present invention,
there is provided a method for producing a polyester resin composition comprising a polysiloxane-mixed polyester resin (R) comprising a polyester compound (P) and an amino group-containing polysiloxane compound (C) mixed, a phosphorus-containing flame retardant (G), a metal hydrate (I), and a fluorine-containing polymer (J),
the method comprising a step of mixing and stirring a mixture in a melt state comprising the polyester compound (P), the amino group-containing polysiloxane compound (C), the phosphorus-containing flame retardant (G), the metal hydrate (I), and the fluorine-containing polymer (J),
wherein the blend amount of the polyester compound (P) is in the range of 30 to 65% by mass with respect to the polyester resin composition;
the blend amount of the amino group-containing polysiloxane compound (C) is in the range of 1.5 to 10% by mass with respect to the polyester resin composition;
the blend amount of the phosphorus-containing flame retardant (G) is in the range of 1 to 20% by mass with respect to the polyester resin composition;
the blend amount of the metal hydrate (I) is in the range of 30 to 60% by mass with respect to the polyester resin composition; and
the blend amount of the fluorine-containing polymer (J) is in the range of 0.1 to 5% by mass with respect to the polyester resin composition.

Advantageous Effects of Invention

According to exemplary embodiments of the first means of the present invention, there can be provided a polylactic acid resin composition having high flame retardancy and excellent impact resistance and flexibility, and a molded body thereof.

According to exemplary embodiments of the second means of the present invention, there can be provided a polyester resin composition having high flame retardancy, and a molded body thereof.

DESCRIPTION OF EMBODIMENTS

In order to achieve the first object, the present inventors have exhaustively studied improvements of flame retardancy, impact resistance and flexibility (bending breaking strain and the like) of polylactic acid resins. As a result, it has been found that excellent flame retardancy and impact resistance, and good flexibility to bending breaking strain and the like can be attained by using a metal hydrate surface-treated with an aminosilane coupling agent, a ureidosilane coupling agent, an isocyanate silane coupling agent or an epoxysilane coupling agent as a metal hydrate in a polylactic acid resin composition comprising a polylactic acid resin, an aliphatic polyester resin, a metal hydrate, and a carbodiimide compound.

It has further been found that further higher flame retardancy can be achieved by blending a phosphorus-containing flame retardant and/or a fluorine-containing polymer in the polylactic acid resin composition, while maintaining excellent impact resistance and good flexibility to bending breaking strain and the like.

Further, as the polylactic acid resin, a modified polylactic acid resin obtained by reacting a polylactic acid compound with an amino group-containing polysiloxane compound can be used. The modified polylactic acid resin can be obtained by melt mixing an amino group-containing polysiloxane compound with an unmodified polylactic acid resin (polylactic acid compound) before the reaction with the amino group-containing polysiloxane compound.

Here, the polylactic acid resin composition according to the present exemplary embodiment may comprise an unmodified polylactic acid resin (polylactic acid compound) as the polylactic acid resin, but from the viewpoint of providing further excellent impact resistance and good flexibility to bending breaking strain and the like and higher flame retardancy, it is preferable that the polylactic acid resin comprise the modified polylactic acid resin.

It is considered that the reason that the polylactic acid resin composition according to the exemplary embodiment of the present invention exhibits especially excellent mechanical properties such as impact resistance is because the transesterification of the aliphatic polyester resin with the polylactic acid resin forms a polyester-polylactic acid copolymer. It is considered that the presence of the polyester-polylactic acid copolymer can impart excellent impact resistance and good flexibility to bending breaking strain and the like to molded articles obtained by using such a polylactic acid resin composition. These mechanisms, however, are presumptions, and do not any more limit the present invention.

It is preferable that such a polylactic acid resin composition be one obtained by melt mixing a material comprising a polylactic acid resin, an aliphatic polyester resin, a metal hydrate, and a carbodiimide compound. The melt mixing mentioned here means mixing in the state of at least the polylactic acid resin and the aliphatic polyester resin being melted. In the melt mixing, a polyester-polylactic acid copolymer can be formed.

Further it is considered that when the polylactic acid resin has a segment of an amino group-containing polysiloxane compound and a segment of a polylactic acid compound in the polylactic acid resin composition, the polysiloxane-polylactic acid copolymer (modified polylactic acid resin) in which the segments are bound to each other is formed. It is considered that the presence of the polysiloxane-polylactic acid copolymer can impart excellent impact resistance and good flexibility to bending breaking strain and the like to molded articles obtained by using such a polylactic acid resin composition, and can further impart higher flame retardancy thereto. Here, it is considered that the polysiloxane-polylactic acid copolymer is formed by a reaction of the amino group of the amino group-containing polysiloxane compound with the ester group (ester bond moiety) of the polylactic acid compound.

Further, the polylactic acid resin composition is excellent also in bleed resistance. Although a polylactic acid compound and a polysiloxane compound are primarily poor in compatibility and liable to cause poor dispersion and bleeding, a polysiloxane-polylactic acid copolymer is formed in which a reaction of a polysiloxane compound having a specific amount of an amino group with a polylactic acid compound incorporates a specific amount of the polysiloxane compound in the polylactic acid compound in the polylactic acid resin composition. The polysiloxane-polylactic acid copolymer is well dispersed in the polylactic acid resin composition, and forms silicone elastomer particles well bound to the polylactic acid resin interface. It is considered that hence, the bleed resistance can be imparted to molded articles obtained by using the polylactic acid resin composition. These mechanisms, however, are presumptions, and does not any more limit the present invention.

It is preferable that such a polylactic acid resin composition be one obtained by melt mixing a material comprising a polylactic acid compound, an amino group-containing polysiloxane compound, an aliphatic polyester resin, a metal hydrate, and a carbodiimide compound. The melt mixing mentioned here means mixing in the state of at least the polylactic acid compound, the amino group-containing polysiloxane compound and the aliphatic polyester resin being melted. In the melt mixing, a modified polylactic acid resin (polysiloxane-polylactic acid copolymer) can be formed, and a reaction product (polyester-polylactic acid copolymer) of the modified polylactic acid resin with the aliphatic polyester resin can further be formed.

In order to achieve the second object, the present inventors have exhaustively studied physical properties of polyester compounds such as polylactic acids, particularly the improvement of flame retardancy. As a result, it has been found that a composition having sufficient mechanical properties and simultaneously having excellent flame retardancy can be obtained by mixing a polysiloxane-mixed polyester resin (R) in which at least a part of a polyester compound is modified with an amino group-containing polysiloxane compound, a phosphorus-containing flame retardant (C), a metal hydrate (D), and a fluorine-containing polymer (J) in specific blend amounts.

It has been further found that in the polyester resin composition, use of a metal hydrate surface-treated with a specific silane coupling agent can provide, in addition to excellent flame retardancy, better mechanical properties (impact resistance, flexibility (bending breaking strain and the like)).

The polysiloxane-mixed polyester resin (R) can comprise a modified polyester compound obtained by reacting a polyester compound (P) with an amino group-containing polysiloxane compound (C). The modified polyester compound can be formed by melt mixing the amino group-containing polysiloxane compound (C) with the polyester compound (P).

The polyester compound (P) is not especially limited as long as it has sufficient molding processability and exhibits desired mechanical properties, but a polyhydroxycarboxylic acid resin such as a polylactic acid compound or a polybutylene succinate resin described later can suitably be used.

The polyester compound (P) additionally includes aliphatic polyesters such as polycaprolactone (PCL), poly(caprolactone/butylene succinate), polybutylene succinate (PBS), polyethylene succinate (PES) and polybutylene succinate adipate (PBSA);

modified aliphatic polyesters such as poly(butylene adipate/terephthalate) (PBAT), poly(tetramethylene adipate/terephthalate), poly(ethylene terephthalate/succinate) and poly(butylene succinate/carbonate) (PBSC); and aromatic polyesters such as polybutylene terephthalate (PBT).

Among these, from the viewpoint of molding processability, biodegradability and the like, preferable are polylactic acid-based polyesters such as polyhdroxycarboxylic acids, for example, polylactic acid, or (polylactic acid/polybutylene succinate) block copolymers, and aliphatic polyesters made from a hydroxylcarboxylic acid and a diol.

It is preferable that the polyester compound (P) comprise particularly a polylactic acid compound (A) and an aliphatic polyester resin (B) described later.

The polyester resin composition according to the exemplary embodiment of the present invention, in the case where the polyester compound (P) comprises a polylactic acid compound (A) and an aliphatic polyester resin (B), can exhibit excellent mechanical properties such as impact resistance. The reason therefor is conceivably because the transesterification of the aliphatic polyester resin with the polylactic acid compound forms a polyester-polylactic acid copolymer. It is considered that the presence of the polyester-polylactic acid copolymer can impart excellent impact resistance and good flexibility to bending breaking strain and the like to molded articles obtained by using such a polyester resin composition (polylactic acid resin composition). These mechanisms are presumptions, and does not any more limit the present invention, however.

It is preferable that the polyester resin composition according to the exemplary embodiment be one obtained by melt mixing a material comprising a polyester compound (preferably comprising a polylactic acid compound and an aliphatic polyester resin), an amino group-containing polysiloxane compound, a phosphorus-containing flame retardant, a metal hydrate, and a fluorine-containing polymer. The melt mixing mentioned here means that the polyester compound (a polylactic acid compound and an aliphatic polyester resin when the polyester compound comprises the both) and the amino group-containing polysiloxane compound are mixed in a melted state. In the melt mixing, a polysiloxane-modified polyester compound (for example, a polysiloxane-polylactic acid copolymer) can be formed by a reaction of the polyester compound (particularly the polylactic acid compound) with the amino group-containing polysiloxane compound. Further in the case where the polyester compound comprises a polylactic acid compound and an aliphatic polyester resin, a polyester-polylactic acid copolymer can be formed. The amino group-containing polysiloxane compound may be bound to the polyester-polylactic acid copolymer.

It is preferable from the viewpoint of having a fibrillary structure and forming molded articles exhibiting high heat resistance that the polyester resin composition according to the present exemplary embodiment be one obtained by melt mixing and extruding a mixture of components.

In the present exemplary embodiment, flexibility can be imparted to the polyester compound by binding (copolymerizing) a high-polarity polyester compound with a low-polarity reactive silicone (aminosilicone: amino group-containing polysiloxane compound). When a fluorine-containing polymer as a drip prevention agent is added to a resin composition comprising the modified polyester compound imparted with flexibility, molded articles obtained by molding the resin composition easily shrink (converge) in combustion and the thickness of the molded articles can be made large; consequently, high flame retardancy can be attained. Further the incorporation of a metal hydrate (for example, aluminum hydroxide of a low alkali content) which causes an endothermic reaction in combustion and is made flame-retardant, and a phosphorus-containing flame retardant (for example, a phosphazene derivative) which generates a nonflammable gas in combustion can achieve higher flame retardancy.

Further in the polyester resin composition, it is considered that, in the polysiloxane-mixed polyester resin (R), there is formed a polysiloxane polyester copolymer (modified polyester compound) having a segment of the amino group-containing polysiloxane compound (C) and a segment of the polyester compound (P), the segments being bound to each other. Further in the case where the polyester compound (P) comprises the polylactic acid compound (A) and the aliphatic polyester resin (B), it is considered that there is formed a modified polylactic acid compound having a segment of the amino group-containing polysiloxane compound (C) and a segment of the polylactic acid compound (A) and the like, the segments being bound to each other.

It is considered that the presence of such a polysiloxane-mixed polyester resin (R) (for example, modified polylactic acid resin compound) can impart excellent impact resistance and good flexibility to bending breaking strain and the like to molded articles obtained by molding the polyester resin composition, and can further impart higher flame retardancy thereto by the interactions with the other components (phosphorus-containing flame retardant, metal hydrate, fluorine-containing polymer).

Here, in the polysiloxane-mixed polyester resin (R), it is considered that the modified polyester compound is generated by a reaction of the amino group of the amino group-containing polysiloxane compound (C) with the ester group (ester bond moiety) of the polyester compound (P) (for example, the polylactic acid compound (A) and the aliphatic polyester resin (B)).

Further the polyester resin composition according to the present exemplary embodiment is excellent also in bleed resistance. Although a polyester compound (for example, a polylactic acid compound and an aliphatic polyester resin) and a polysiloxane compound are primarily poor in compatibility and are liable to cause poor dispersion and bleeding, a polysiloxane-polyester copolymer (for example, polysiloxane-polylactic acid copolymer) is formed in which a specific amount of the polysiloxane compound is incorporated in the polyester compound (for example, polylactic acid compound) by a reaction of the polysiloxane compound having a specific amount of an amino group with the polyester compound (for example, polylactic acid compound) in the polyester resin composition. The polysiloxane-polyester copolymer (for example, polysiloxane-polylactic acid copolymer) is well dispersed in the polyester resin composition, and forms silicone elastomer particles well bound to the resin interface. It is therefore considered that the bleed resistance can be imparted to molded articles obtained by using the polyester resin composition. These mechanisms are presumptions and do not any more limit the present invention, however.

(A Compositional Example of the Polyester Resin Composition)

It is preferable that the polyester resin composition excellent in flame retardancy according to the exemplary embodiment of the second means of the present invention have the following composition.

In the polyester resin composition according to the present exemplary embodiment, the polysiloxane-mixed polyester resin (R) comprises the polyester compound (P) and the amino group-containing polysiloxane compound (C) melt-mixed, wherein the content of the polyester compound (P) constituting the polysiloxane-mixed polyester resin (R) is in the range of 30 to 65% by mass with respect to the polyester resin composition;

the content of the amino group-containing polysiloxane compound (C) constituting the polysiloxane-mixed polyester resin (R) is in the range of 1.5 to 10% by mass (preferably 1.5 to 5.0% by mass) with respect to the polyester resin composition;

the content of the phosphorus-containing flame retardant (G) is in the range of 1 to 20% by mass (preferably 1 to 15% by mass, more preferably 2 to 10% by mass) with respect to the polyester resin composition;

the content of the metal hydrate (I) is in the range of 30 to 60% by mass (preferably 30 to 50% by mass, more preferably 40 to 50% by mass) with respect to the polyester resin composition; and the content of the fluorine-containing polymer (J) is in the range of 0.1 to 5% by mass (preferably 0.1 to 3% by mass, more preferably 0.1 to 2% by mass, still more preferably 0.2 to 2% by mass) with respect to the polyester resin composition.

The content of the amino group-containing polysiloxane compound (C) constituting the polysiloxane-mixed polyester resin (R) is preferably in the range of 1.5 to 10% by mass, and more preferably in the range of 1.5 to 5.0% by mass with respect to the polyester resin composition. When the content of the amino group-containing polysiloxane compound is 1.5% by mass or higher, the flame retardancy can remarkably be enhanced. Further when the content of the amino group-containing polysiloxane compound is 10% by mass or lower, reduction of mechanical properties (for example, impact resistance and flexibility to bending strength) is suppressed and the flame retardancy can simultaneously be enhanced. The content of the amino group-containing polysiloxane compound is, with respect to the polyester resin composition, more preferably 2% by mass or higher, and then preferably 5% by mass or lower, more preferably 4% by mass or lower, and still more preferably 3.5% by mass or lower.

It is preferable that the polyester compound (P) comprise the polylactic acid compound (A) and the aliphatic polyester resin (B). At this time, the content of the polylactic acid compound (A) constituting the polyester compound (P) is, with respect to the polyester resin composition, preferably in the range of 25 to 55% by mass, and more preferably in the range of 25 to 50% by mass. Further the content of the aliphatic polyester resin (B) constituting the polyester compound (P) is, with respect to the polyester resin composition, preferably in the range of 5 to 20% by mass, and more preferably in the range of 5 to 15% by mass.

It is preferable that the metal hydrate (I) be a metal hydrate surface-treated with an aminosilane coupling agent, a ureidosilane coupling agent, an isocyanate silane coupling agent or an epoxysilane coupling agent.

Further, the content of an alkali metal substance in the metal hydrate (I) is preferably 0.2% by mass or lower.

It is preferable that the polyester resin composition according to the present exemplary embodiment further comprise a carbodiimide compound. Then the content of the carbodiimide compound is preferably in the range of 0.5 to 3% by mass with respect to the polyester resin composition.

It is preferable that the polyester resin composition according to the present exemplary embodiment further comprise a crystal nucleating agent. Then the content of the crystal nucleating agent is preferably in the range of 0.2 to 2% by mass, with respect to the polyester resin composition.

The polyester resin composition according to the present exemplary embodiment may further comprise a plasticizer. In the case where the plasticizer is contained, the content thereof is, preferably in the range of 0.5 to 5% by mass with respect to the polyester resin composition.

The polyester resin composition according to the present exemplary embodiment may further comprise a glass fiber. In the case where the glass fiber is contained, the content thereof is preferably in the range of 1 to 10% by mass with respect to the polyester resin composition.

Hereinafter, exemplary embodiments of the first and second means will further be described.

(Amino Group-Containing Polysiloxane Compound)

In the segment of the amino group-containing polysiloxane compound, it is preferable that the amino group be bound to a side chain of a polysiloxane compound. In the amino group-containing polysiloxane compound having an amino group in its side chain, the regulation of the concentration of the amino group is easy; and the regulation of the reaction with the segment of the polylactic acid compound (or polyester compound) becomes easy. Particularly when the amino group is a di-amino group, the reactivity with the polylactic acid compound is higher than that with a mono-amino group, which is preferable.

The content of the amino group with respect to the amino group-containing polysiloxane compound is made to be preferably in such a range that while the reactivity with the segment of the polylactic acid compound is maintained, the molecular weight of the amino group-containing polysiloxane compound is made high, and the volatilization of the amino group-containing polysiloxane compound in production can be suppressed. Such content of the amino group is in the range of 0.01% by mass to 2.5% by mass, and preferably in the range of 0.01% by mass to 1.0% by mass. When the content of the amino group is 0.01% by mass or higher, the amide bond with the segment of the polylactic acid compound is sufficiently formed; then, efficient production can be accomplished and the bleedout of the polysiloxane segment due to the separation thereof in molded articles can be suppressed. When the content of the amino group is 2.5% by mass or lower, the hydrolysis of the polylactic acid compound in production is suppressed and the aggregation is suppressed; then, there can be obtained molded articles having a high mechanical strength and having a homogeneous composition.

The content of the amino group can be determined by the following expression (I).

$$\text{Content of the amino group (\% by mass)} = (16/\text{amino equivalent}) \times 100 \quad (I)$$

Amino equivalent: an average value (g/mol) of the mass of the amino group-containing polysiloxane compound per 1 mol of the amino group Further the blend amount of the amino group of the amino group-containing polysiloxane compound with respect to the polylactic acid compound (in the second means, in the case where the polylactic acid compound (A) is contained as the polyester compound (P)) is preferably in the range of 3 ppm by mass to 300 ppm by mass, and more preferably in the range of 50 ppm by mass to 300 ppm by mass. When the blend amount of the amino group is 3 ppm by mass or larger, there can be achieved the improvement of impact resistance caused by the segment of the amino group-containing polysiloxane compound in molded articles. When the blend amount of the amino group is 300 ppm by mass or smaller, the dispersing of the polylactic acid compound (or the polyester compound) and the amino group-containing polysiloxane compound becomes easy and a remarkable reduction of the molecular weight of the polylactic acid resin (or the polyester compound) is suppressed; then, there can be provided molded articles excellent in mechanical strength such as impact strength.

The blend amount of the amino group can be determined by the following expression (II).

> Blend amount of the amino group (ppm by mass)=
> 100×a content (% by mass) of the amino group
> with respect to the amino group-containing
> polysiloxane compound×a ratio (% by mass) of
> the amino group-containing polysiloxane compound to the polylactic acid compound  (II)

It is preferable that the amino group-containing polysiloxane compound constituting such a segment be one which is easily bound to the segment of the polylactic acid compound (or the polyester compound) under a gentle melt condition, without using any special means. Examples of such an amino group-containing polysiloxane compound include ones represented by the following formula (1) and the following formula (2).

[Formula 1]

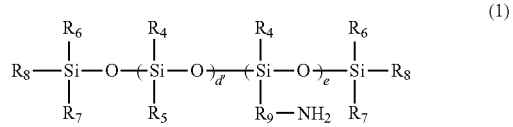

(1)

[Formula 2]

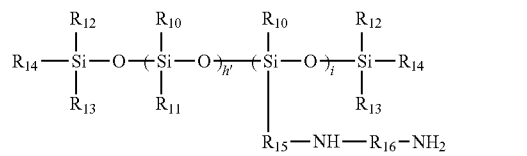

(2)

In the above formulae (1) and (2), $R_4$ to $R_8$ and $R_{10}$ to $R_{14}$ each independently denote an alkyl group, alkenyl group, aryl group, aralkyl group or alkylaryl group each having 18 or less carbon atoms, or —$(CH_2)_\alpha$—NH—$C_6H_5$ ($\alpha$ is an integer of 1 to 8), and these may be fully or partially substituted with a halogen atom(s); $R_9$, $R_{15}$ and $R_{16}$ each independently denote a divalent organic group; and d' and h' each denote an integer of 0 or more, and e and i each denote an integer of 1 or more.

The alkyl group is preferably a methyl group, an ethyl group, a propyl group, a butyl group, a t-butyl group or the like. The alkenyl group is preferably a vinyl group. The aryl group is preferably a phenyl group, a naphthyl group or the like. The alkylaryl group includes a benzyl group. The halogen atom(s) includes chlorine, fluorine and bromine. Groups having such halogen substituents specifically include a chloromethyl group, a 3,3,3-trifluoromethyl group, a perfluorobutyl group, a perfluorooctyl group. It is preferable that $R_4$ to $R_8$ and $R_{10}$ to $R_{14}$ be particularly a methyl group or a phenyl group.

The phenyl group has a function of improving transparency of the segment of the polysiloxane compound. By regulating the content of the phenyl group, the refractive index of the polylactic acid resin (or the polyester resin) can be regulated. By making the refractive index of the segment of the polysiloxane compound to coincide with the refractive index of the segment of the polylactic acid resin (or the polyester resin), a uniform refractive index can be made in molded articles and a desired degree of clearness can be imparted to the molded articles.

The divalent organic group includes alkylene groups such as a methylene group, an ethylene group, a propylene group and a butylene group, alkylarylene groups such as a phenylene group and a tolylene group, oxyalkylene groups or polyoxyalkylene groups such as —$(CH_2$—$CH_2$—$O)_b$— (b is an integer of 1 to 50) and —$[CH_2$—$CH(CH_3)$—$O]_c$— (c is an integer of 1 to 50), and —$(CH_2)_d$—NHCO— (d is an integer of 1 to 8). Among these, it is preferable that particularly, $R_{16}$ be an ethylene group; and $R_9$ and $R_{15}$, a propylene group.

d', h', e and j are preferably such values as make the number-average molecular weight of the polysiloxane compound to come into a range described later. d' and h' are each preferably an integer of 1 to 15,000, more preferably an integer of 1 to 400, and still more preferably an integer of 1 to 100. e and i are each preferably in the range of 1 to 15,000, and more preferably an integer satisfying that the content of the amino group with respect to the amino group-containing polysiloxane compound determined by the above expression (I) is in the range of 0.01% by mass to 2.5% by mass.

In the amino group-containing polysiloxane compounds represented by the above formulae (1) and (2), repeating units repeated according to the numbers of the repeating units d', h', e and i, respectively, may be connected with same repeating units being continuously connected, may be connected alternately, or may be connected randomly.

The number-average molecular weight of the amino group-containing polysiloxane compound is preferably in the range of 900 to 120,000. When the number-average molecular weight is 900 or higher, in production of the polylactic acid resin composition (or the polyester resin composition), loss due to volatilization of the amino group-containing polysiloxane compound in kneading with the melted polylactic acid compound can suppressed. When the number-average molecular weight is 120,000 or lower, the dispersibility is favorable and uniform molded articles can be provided. The number-average molecular weight is more preferably in the range of 900 to 20,000, and still more preferably in the range of 900 to 8,000.

As the number-average molecular weight, there can be adopted a measurement value (calibrated with polystyrene standard samples) measured, for example, by GPC (gel permeation chromatography) analysis of a 0.1% chloroform solution of a sample.

The segment of the amino group-containing polysiloxane compound may comprise, in the range of not inhibiting the function of the amino group-containing polysiloxane compound, a segment of a polysiloxane compound having an amino group on a terminal of the main chain, and further a segment of a polysiloxane compound or the like having no amino groups. The content of the polysiloxane compound having an amino group on a terminal of the main chain and the polysiloxane compound having no amino groups (in the case of comprising both the compounds, the content is their total) is, in the amino group-containing polysiloxane compound, preferably in the range of 0% by mass to 5% by mass. The number-average molecular weight of the polysiloxane compound having an amino group on a terminal of the main chain and the polysiloxane compound having no amino groups is preferably in the range of 900 to 120,000.

Then, it is more preferable that the amino group-containing polysiloxane compound be a side-chain di-amino-type polysiloxane compound represented by the formula (2), because the side-chain di-amino-type polysiloxane compound is better in the reactivity and more quickly reacts with the polylactic acid compound in melt kneading than a side-chain mono-amino-type polysiloxane compound represented by the formula (1).

(Polylactic Acid Compound)

The polylactic acid compound (or the polylactic acid compound constituting the segment of the polylactic acid compound contained in the modified polylactic acid resin) to be used for the polylactic acid resin composition (or the polyester resin composition) according to the present exemplary embodiment includes extracts of polylactic acid compounds obtained from biomass raw materials, derivatives thereof, or modified compounds thereof; polycondensates synthesized by using monomers, oligomers, derivatives thereof or modified compounds thereof of lactic acid compounds obtained from biomass raw materials; and additionally polylactic acid compounds synthesized by using raw materials other than biomass raw materials. Examples of such polylactic acid compounds include a compound represented by the following formula (3).

[Formula 3]

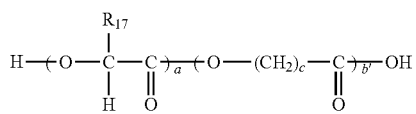

(3)

In the above formula (3), $R_{17}$ denotes an alkyl group having 18 or less carbon atoms; and a and c each denote an integer of 1 or more, and b' denotes an integer of 0 or more.

a is preferably an integer of 500 to 13,000, and more preferably an integer of 1,500 to 4,000. b' is preferably an integer of 0 to 5,000. c is preferably an integer of 1 to 50. In the polylactic acid compound represented by the formula (3), repeating units repeated according to the numbers of the repeating units a and b', respectively, may be connected with the same repeating units being continuously connected, or may be connected alternately.

The polylactic acid compound represented by the formula (3) specifically includes polymers of L-lactic acid, D-lactic acid or derivatives thereof, and copolymers containing these as a main component. Such copolymers include copolymers obtained from L-lactic acid, D-lactic acid and/or derivatives thereof, and one or two or more of, for example, glycolic acid, polyhydroxybutyric acid, polycaprolactone, polybutylene succinate, polybutylene succinate adipate, polyethylene succinate, polybutylene adipate terephthalate, polybutylene succinate terephthalate and polyhydroxyalkanoates.

Among these, from the viewpoint of saving petroleum resources, the polylactic acid compounds using raw materials originated from plants are preferable; and in terms of heat resistance and moldability, especially preferable are poly(L-lactic acid), poly(D-lactic acid), and copolymers of L-lactic acid and D-lactic acid. Polylactic acids made from poly(L-lactic acid) as a main component have different melting points depending on the ratio of the D-lactic acid component, but it is preferable in consideration of the mechanical properties and the heat resistance of molded articles that the polylactic acid compound represented by the formula (3) be one having a melting point of 160° C. or higher.

The weight-average molecular weight (in terms of standard polystyrenes by gel permeation chromatography (GPC)) of the polylactic acid compound is preferably in the range of 30,000 to 1,000,000, and more preferably in the range of 50,000 to 300,000.

(Aliphatic Polyester Resin)

Examples of the aliphatic polyester resin include polybutylene succinate, polybutylene succinate adipate and polycaprolactone. The aliphatic polyester resin has a number-average molecular weight (in terms of standard polystyrene by GPC), not especially limited, of for example, 10,000 to 100,000, preferably 30,000 to 90,000, and more preferably 30,000 to 70,000; and a weight-average molecular weight (in terms of standard polystyrene by GPC), not especially limited, of for example, 20,000 to 200,000, preferably 40,000 to 190,000, and more preferably 100,000 to 180,000. The aliphatic polyester resin may satisfy, for example, both of the above number-average molecular weight and the above weight-average molecular weight, or either one thereof. It is preferable that such an aliphatic polyester resin be polybutylene succinate adipate.

(Blend Amounts of the Resin Components in the Polylactic Acid Resin Composition in the First Means)

The content (blend amount) of the polylactic acid resin in the polylactic acid resin composition according to the exemplary embodiment of the first means is, from the viewpoint of sufficiently attaining the desired effect by the exemplary embodiment of the present invention, preferably 25% by mass or higher and 60% by mass or lower, and more preferably 30% by mass or higher, and then more preferably 55% by mass or lower and still more preferably 50% by mass or lower, with respect to the total amount of the polylactic acid resin composition.

Here, the content (blend amount) of the polylactic acid resin, in the case where the polylactic acid resin composition according to the present exemplary embodiment comprises the polylactic acid compound (unmodified polylactic acid resin) as the polylactic acid resin, means a blend amount of the polylactic acid compound, and in the case of comprising the modified polylactic acid resin as the polylactic acid resin, means a blend amount of the polylactic acid compound corresponding to the segment of the polylactic acid compound constituting the modified polylactic acid resin.

The content (blend amount) of the amino group-containing polysiloxane compound in the polylactic acid resin composition according to the exemplary embodiment of the first means, can be set at 0% by mass or higher and 5% by mass or lower, and from the viewpoint of sufficiently attaining the effect by the amino group-containing polysiloxane compound, is preferably 0.1% by mass or higher, more preferably 0.5% by mass or higher, still more preferably 1% by mass or higher, and particularly from the viewpoint of improving flame retardancy, is preferably 1.5% by mass or higher, with respect to the total amount of the polylactic acid resin composition. The content is allowed to exceed 5% by mass, but attaining the improving effect corresponding to the content becomes difficult, and there arises a risk of reducing the mechanical properties of molded articles obtained. Hence, the content is preferably 5% by mass or lower.

Here, the content (blend amount) of the amino group-containing polysiloxane compound includes a blend amount of the amino group-containing polysiloxane compound corresponding to the segment of the amino group-containing polysiloxane compound constituting the modified polylactic acid resin. Further in the case where the amino group-containing polysiloxane compound reacts with the ester group (ester bond) of the aliphatic polyester resin, the content (blend amount) includes a blend amount of the amino group-containing polysiloxane compound corresponding to the segment of the amino group-containing polysiloxane compound constituting the reaction product. That is, the content (blend amount) of the amino group-containing polysiloxane compound includes, irrespective of kinds of components bound in the polylactic acid resin composition, the amino group-containing polysiloxane compound corresponding to the segment of the amino group-containing polysiloxane compound.

The content (blend amount) of the aliphatic polyester resin in the polylactic acid resin composition according to the exemplary embodiment of the first means is, from the viewpoint of sufficiently attaining the desired effect by the exemplary embodiment of the present invention, preferably 0.05% by mass or higher and 40% by mass or lower with respect to the total amount of the polylactic acid resin composition. When the content is lower than 0.05% by mass, a sufficient improving effect of the impact resistance cannot be attained; and when the content exceeds 40% by mass, it becomes difficult to attain an improving effect of the impact resistance corresponding to the increase, even if the addition amount is increased. The content of the aliphatic polyester resin is more preferably 1% by mass or higher and still more preferably 5% by mass or higher, and more preferably 30% by mass or lower, still more preferably 20% by mass or lower and especially preferably 15% by mass or lower.

(Blend Amounts of the Resin Components in the Polyester Resin Composition in the Second Means)

The content (blend amount) of the polylactic acid compound in the polyester resin composition according to the exemplary embodiment of the second means is, from the viewpoint of sufficiently attaining the desired effect by the exemplary embodiment of the present invention, preferably 25% by mass or higher and 60% by mass or lower, and more preferably 30% by mass or higher and more preferably 40% by mass or higher, and then more preferably 55% by mass or lower and still more preferably 50% by mass or lower with respect to the total amount of the polyester resin composition.

The content (blend amount) of the amino group-containing polysiloxane compound in the polyester resin composition according to the exemplary embodiment of the second means is, particularly from the viewpoint of improving the flame retardancy, preferably 1.5% by mass or higher with respect to the total amount of the polyester resin composition. The content is allowed to exceed 10% by mass, but attaining the improving effect corresponding to the content becomes difficult, and there arises a risk of reducing the mechanical properties of molded articles obtained. Hence, the content is preferably 10% by mass or lower, and more preferably 5% by mass or lower.

Here, the content (blend amount) of the amino group-containing polysiloxane compound includes a blend amount of the amino group-containing polysiloxane compound corresponding to the segment of the amino group-containing polysiloxane compound constituting the modified polylactic acid resin. Further in the case where the amino group-containing polysiloxane compound reacts with the ester group (ester bond) of the aliphatic polyester resin, the content (blend amount) includes a blend amount of the amino group-containing polysiloxane compound corresponding to the segment of the amino group-containing polysiloxane compound constituting the reaction product. That is, the content (blend amount) of the amino group-containing polysiloxane compound includes, irrespective of kinds of components bound in the polyester resin composition, the amino group-containing polysiloxane compound corresponding to the segment of the amino group-containing polysiloxane compound.

The content (blend amount) of the aliphatic polyester resin in the polyester resin composition according to the exemplary embodiment of the second means is, from the viewpoint of sufficiently attaining the desired effect by the exemplary embodiment of the present invention, preferably 0.05% by mass or higher and 40% by mass or lower with respect to the total amount of the polyester resin composition. When the content is lower than 0.05% by mass, a sufficient improving effect of the impact resistance cannot be attained; and when the content exceeds 40% by mass, even if the addition amount is increased, it becomes difficult to attain an improving effect of the impact resistance corresponding to the increase. The content of the aliphatic polyester resin is more preferably 1% by mass or higher and still more preferably 5% by mass or higher, and then more preferably 30% by mass or lower, still more preferably 20% by mass or lower and especially preferably 15% by mass or lower.

(Carbodiimide Compound)

The carbodiimide compound includes polycarbodiimide compounds and monocarbodiimide compounds. The polycarbodiimide compounds include ones having a fundamental structure of the following general formula (4).

[Formula 4]

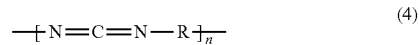

(4)

In the formula (4), n denotes an integer of 2 or more; and R denotes an aliphatic or aromatic organic group composed of C and H. As the aliphatic organic group, alicyclic organic groups are preferable. n is preferably 2 to 50. For example, polycarbodiimides having n in the range of 2 to 20 can be used, and further polycarbodiimides having n in the range of 5 to 20 can be used.

With respect to the carbodiimide compound, one synthesized by a commonly well-known method can be used. As the carbodiimide compound, there can be used, for example, one synthesized by subjecting various organic diisocyanates to a decarbonation condensation reaction solventless or in an inert solvent at a temperature of about 70° C. or higher using an organphosphorus compound or an organometal compound as a catalyst.

As an organic diisocyanate of a raw material for producing a polycarbodiimide compound, there can be used one selected from aliphatic diisocyanates (preferably alicyclic diisocyanates), aromatic diisocyanates and mixtures of two or more thereof. Specific examples thereof include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 3,3',5,5'-tetraisopropylbiphenyl-4,4'-diisocyanate and 1,3,5-triisopropylbenzene-2,4-diisocyanate.

The monocarbodiimide includes dicyclohexylcarbodiimide, diisopropylcarbodiimide, diphenylcarbodiimide, bis(methylphenyl)carbodiimide, bis(methoxyphenyl)carbodiimide, bis(nitrophenyl)carbodiimide, bis(dimethylphenyl)

carbodiimide, bis(diisopropyl)carbodiimide, bis(t-butyl)carbodiimide, N-ethyl-N'-(3-dimethylaminopropyl)carbodiimide, bis(triphenylsilyl)carbodiimide and N,N'-di-2,6-diisopropylphenylcarbodiimide.

The polycarbodiimide includes aliphatic polycarbodiimides such as poly(4,4'-dicyclohexylmethanecarbodiimide); and aromatic polycarbodiimides such as poly(4,4'-diphenylmethanecarbodiimide), poly(p-phenylenecarbodiimide), poly(m-phenylenecarbodiimide), poly(methylphenylenecarbodiimide), poly(diisopropylphenylenecarbodiimide), poly(methyl-diisopropylphenylenecarbodiimide), poly(1,3,5-triisopropylphenylenecarbodiimide), and poly(1,3,5-triisopropylphenylene and 1,5-diisopropylphenylenecarbodiimide).

As the aliphatic polycarbodiimide, preferable are aliphatic polycarbodiimides having an alicyclic structure such as a cyclohexane ring. Examples thereof include polycarbodiimides in which the organic linkage group R of the above general formula contains at least a divalent alicyclic group such as a cyclohexylene group. As such an aliphatic polycarbodiimide, there can suitably be used a poly(4,4'-dicyclohexylmethanecarbodiimide). As a commercially available product of the poly(4,4'-dicyclohexylmethanecarbodiimide), Carbodilite LA-1 (trade name), manufactured by Nisshinbo Chemical Inc., can be used.

The aromatic polycarbodiimide includes polycarbodiimides which have an aromatic structure such as a benzene ring, and for example, in which the organic linkage group R of the above general formula contains at least a substituted or unsubstituted phenylene group. The substituent of the phenylene group is preferably an alkyl group having 1 to 6 carbon atoms, and more preferably an alkyl group having 1 to 4 carbon atoms. The alkyl group includes a methyl group, an ethyl group, a propyl group (n-propyl group, isopropyl group), a butyl group (n-butyl group, isobutyl group, sec-butyl group, tert-butyl group), a straight-chain or branched pentyl group, a straight-chain or branched hexyl group and a cyclohexyl group. The phenylene group may have a plurality of substituents.

The carbodiimide compound may be used singly or in a combination of two or more. Further, a monocarbodiimide compound and a polycarbodiimide compound may be used concurrently, and an aliphatic carbodiimide compound and an aromatic carbodiimide compound may be used concurrently.

The content of the carbodiimide compound is, from the viewpoint of sufficiently attaining the effect by the exemplary embodiment of the present invention, preferably 0.1% by mass or higher and 10% by mass or lower with respect to the total amount of the polylactic acid resin composition in the case of the first means (in the case of the second means, with respect to the polyester resin composition). With lower than 0.1% by mass, a sufficient improving effect of the hydrolysis resistance cannot be attained; and with higher than 10% by mass, even if the addition amount is increased, the improving effect of the hydrolysis resistance corresponding to the increase cannot be attained. The content is more preferably 0.2% by mass or higher and still more preferably 0.5% by mass or higher, and then more preferably 5% by mass or lower and still more preferably 3% by mass or lower. It is preferable that the carbodiimide comprise an aliphatic carbodiimide compound, and that the aliphatic carbodiimide compound be an alicyclic carbodiimide compound. Further, the aliphatic carbodiimide compound and an aromatic carbodiimide compound may be used concurrently. The mixing ratio (mass ratio) of the aliphatic carbodiimide to the aromatic carbodiimide is preferably 9/1 to 1/9, more preferably 7/3 to 3/7, and still more preferably 6/4 to 4/6. The further incorporation of the carbodiimide compound in the polylactic acid resin composition (or the polyester resin composition) according to the present exemplary embodiment, since being able to suppress the hydrolysis of the ester resin, can provide durability capable of withstanding use in a high-temperature high-humidity condition and long-term use.

(Metal Hydrate)

The polylactic acid resin composition according to the exemplary embodiment of the first means of the present invention (and the polyester resin composition according to the exemplary embodiment of the second means of the present invention) comprises the metal hydrate. In the metal hydrate, from the viewpoint of suppressing the hydrolysis of the polyester compound such as the polylactic acid resin (polylactic acid compound), the content of an alkali metal substance in the metal hydrate is preferably 0.2% by mass or lower. The alkali metal substance refers to an oxide or a chloride of an alkali metal such as lithium, sodium or potassium, or an alkaline earth metal such as beryllium, magnesium, calcium, strontium or barium. The content of the alkali metal substance can be measured, for example, by atomic absorption spectrometry, ICP atomic emission spectrometry or the like.

Examples of the metal hydrate include aluminum hydroxide, magnesium hydroxide, dawsonite, calcium aluminate, hydrated gypsum, calcium hydroxide, zinc borate, barium metaborate, borax, kaolin clay and calcium carbonate; and preferable are aluminum hydroxide, magnesium hydroxide and calcium hydroxide, and more preferable is aluminum hydroxide.

Then it is preferable that the metal hydrate be made of granular bodies of 10 μm or smaller in average particle diameter; and it is more preferable that the metal hydrate be made of granular bodies of 0.1 μm to 5 μm in average particle diameter. Here, the average particle diameter of the metal hydrate can be determined, for example, by measuring a median diameter in terms of volume by a diffraction scattering method. Examples of commercially available instruments capable of measuring the average particle diameter include a laser diffraction scattering particle size analyzer LS230, manufactured by Beckman Coulter, Inc.

It is preferable that the metal hydrate be one surface-treated with a silane coupling agent. A method of obtaining a metal hydrate surface-treated with a silane coupling agent is not especially limited, and examples thereof include a method of spraying or coating a solution in which a silane coupling agent is dissolved in a solvent such as acetone, ethyl acetate or toluene on a surface of the metal hydrate having an alkali metal substance content of 0.2% by mass or lower, and thereafter drying to remove the solvent. Among surface-treated metal hydrates, metal hydrates modified particularly with an aminosilane, a ureidosilane, an isocyanate silane or an epoxysilane are excellent in adhesivity with the polylactic acid resin and can simultaneously satisfy both excellent flame retardancy and impact resistance.

As the metal hydrate surface-treated with a silane coupling agent, there can be used one treated with the silane coupling agent in a mass ratio thereof to the metal hydrate before the treatment of 0.1 to 5.0% by mass; and the mass ratio is, from the viewpoint of attaining a sufficient surface treatment effect, preferably 0.3% by mass or higher, and more preferably 0.5% by mass or higher, and from the viewpoint of attaining a surface treatment effect at a reaction ratio as high as possible, preferably 3% by mass or lower, and more preferably 2% by mass or lower.

In the case of carrying out the surface treatment using a surface treating agent, a common method can be used such as a dry-type method, a wet-type method, a spray system or an integral blend system. Specifically, there can be used the dry-type method in which a surface treating agent is sprayed with dry air or nitrogen gas for the treatment while the metal hydrate is stirred using a V-blender or the like; the wet-type method in which a surface treating agent is added for the treatment when the metal hydrate has been dispersed in water and has made a slurry state; the spray system in which a surface treating agent is sprayed for the treatment after the metal hydrate is heated in a high-temperature furnace; the integral blend system in which the metal hydrate, other resin materials and a surface treating agent are simultaneously charged in an extruder for the treatment; and the like.

Here, with respect to the surface treating agent to be used in the dry-type method, the wet-type method and the spray system, the surface treating agent may be used as it is, or may be diluted with an organic solvent (or water) and used as a solution.

With respect to the metal hydrate, particularly a metal hydrate modified with an aminosilane coupling agent or an isocyanate silane coupling agent, since promoting the crystallization of the polylactic acid resin (or the polyester resin) and being able to shorten the molding time, is more preferable.

The content of the metal hydrate is, with respect to the polylactic acid resin composition in the case of the exemplary embodiment of the first means (in the case of the exemplary embodiment of the second means, with respect to the polyester resin composition), preferably in the range of 1% by mass to 50% by mass, more preferably in the range of 30% by mass to 50% by mass, and still more preferably in the range of 40% by mass to 50% by mass. When the content of the metal hydrate is 1% by mass or higher, a sufficient flame retardancy imparting effect can be attained. When the content of the metal hydrate is 50% by mass or lower, the reduction of the mechanical properties can be prevented.

(Flame Retardant)

It is preferable that the polylactic acid resin composition according to the exemplary embodiment of the first means and the polyester resin composition according to the exemplary embodiment of the second means comprise a flame retardant. As the flame retardant, well-known ones can be used, but a phosphorus-containing flame retardant is preferable, and phosphazene derivatives and aromatic condensed phosphate esters, since being excellent in the flame retardant effect, are more preferable. Examples of the phosphazene derivatives include cyclic phosphazene compounds represented by the following formula.

[Formula 5]

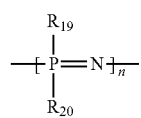

(5)

n denotes an integer of 3 or more, and is preferably in the range of 3 to 25 and more preferably in the range of 3 to 5. With n being 3, P (phosphorus element) and N (nitrogen element) form a 6-membered ring; with n being 4, P and N form a 8-membered ring; and even with n being 5 or more, P and N form similarly a ring structure. $R_{19}$ and $R_{20}$ each independently denote an organic group, and are, for example, a substituted or unsubstituted phenoxy group, or a substituted or unsubstituted naphthoxy group (for example, (3-naphthoxy group).

Examples of the phosphazene derivatives include cyclophosphazene compounds having a phenoxy group, cyclophosphazene compounds having a cyanophenoxy group, cyclophosphazene compounds having an aminophenoxy group and cyclophosphazene compounds having a substituted or unsubstituted naphthoxy group. Among these cyclophosphazene compounds, preferable are cyclotriphosphazene, cyclotetraphosphazene and cyclopentaphosphazene which have a substituted or unsubstituted phenoxy group or a substituted or unsubstituted naphthoxy group; and especially preferable is cyclotriphosphazene having a substituted or unsubstituted phenoxy group. Specific examples thereof include hexaphenoxycyclotriphosphazene (the phenoxy group may have a substituent). It is preferable that the cyclophosphazene compound, since being liable to form a quinone structure causing coloration due to oxidation, have no phenolic hydroxyl group. The phosphazene derivatives may be used singly or concurrently in two or more.

The aromatic condensed phosphate esters include 1,3-phenylene bis(di-2,6-xylenylphosphate), resorcinol bisdiphenylphosphate, bisphenol A bisdiphenylphosphate, resorcinol-bis-2,6-xylenylphosphate, resorcinol-bis-2,6-bisdiphenylphosphate, biphenol-bisphenylphosphate and 4,4'-bis(diphenylphosphoryl)-1,1'-biphenyl.

The content of the flame retardant is, though it is preferable that the content be determined over checking the effect, from the viewpoint of flame retardancy, bending breaking strain, impact resistance, heat resistance and bleed resistance, with respect to the polylactic acid resin composition in the case of the exemplary embodiment of the first means (in the case of the exemplary embodiment of the second means, with respect to the polyester resin composition), preferably in the range of 0.5% by mass to 20% by mass, more preferably in the range of 1% by mass to 15% by mass, and still more preferably 2% by mass to 10% by mass.

(Fluorine-Containing Polymer)

It is preferable that the polylactic acid resin composition according to the exemplary embodiment of the first means and the polyester resin composition according to the exemplary embodiment of the second means comprise a fluorine-containing polymer forming a fibrous structure (fibrillar structure) in the resin composition. Blending the fluorine-containing polymer enables the suppressing effect of the drip phenomenon in combustion to be enhanced.

Examples of the fluorine-containing polymer include polytetrafluoroethylene, tetrafluoroethylene copolymers (for example, tetrafluoroethylene-hexafluoropropylene copolymers) and partially fluorinated polymers. Further as the fluorine-containing polymer, there can also be used fluoropolymers of various forms such as fine powdery fluoropolymers, aqueous dispersions of fluoropolymers, mixtures of powdery fluoropolymer and acrylonitrile-styrene copolymer, and mixtures of powdery fluoropolymer and polymethyl methacrylate.

The content of the fluorine-containing polymer, with respect to the polylactic acid resin composition in the case of the exemplary embodiment of the first means (with respect to the polyester resin composition in the case of the exemplary embodiment of the second means), can be set at 0.05% by mass or higher and can further be set at 0.1% by mass or higher, and is preferably 0.2% by mass or higher.

Further the blend amount of the fluorine-containing polymer, with respect to the polylactic acid resin composition (or the polyester resin composition), can preferably be set at 5% by mass or smaller and is preferably 3% by mass or smaller and more preferably 2% by mass or smaller, and can be set at 1% by mass or smaller and can further be set at 0.8% by mass or smaller. When the blend amount of the fluorine-containing polymer is 0.05% by mass or larger, the dripping preventing effect in combustion can stably be attained. When the blend amount of the fluorine-containing polymer is 0.1% by mass or larger, the flame retardancy of the polylactic acid resin composition (or the polyester resin composition) becomes much better. When the blend amount of the fluorine-containing polymer is 5% by mass or smaller, since the fluorine-containing polymer is easily dispersed in the resin, it becomes easy to be homogeneously mixed with the polylactic acid resin composition (or the polyester resin composition) and the stable production of the resin composition having flame retardancy becomes enabled. When the blend amount of the fluorine-containing polymer is 2% by mass or smaller, and further when 1% by mass or smaller, the fluorine-containing polymer is more homogeneously mixed and the flame retardancy of the polylactic acid resin composition (or the polyester resin composition) becomes much better; and when the blend amount of the fluorine-containing polymer is 0.8% by mass or smaller, the flame retardancy of the polylactic acid resin composition (or the polyester resin composition) becomes much better.

(Plasticizer)

The polylactic acid resin composition according to the exemplary embodiment of the first means and the polyester resin composition according to the exemplary embodiment of the second means can further comprise a plasticizer. The content of the plasticizer is, with respect to the polylactic acid resin composition in the case of the exemplary embodiment of the first means (with respect to the polyester resin composition in the case of the exemplary embodiment of the second means), from the viewpoint of attaining a sufficient addition effect, preferably 0.05% by mass or higher, more preferably 0.1% by mass or higher, and still more preferably 0.5% by mass or higher. Further from the viewpoint of not impairing desired mechanical properties and from the viewpoint of suppressing the bleedout, the content is preferably 20% by mass or lower, more preferably 10% by mass or lower, and 5% by mass or lower.

The plasticizer includes aliphatic dibasic acid esters such as adipate esters; phthalate esters such as alkylphthalyl alkyl glycolate (for example, ethylphthalyl ethyl glycolate); ricinolate esters such as acetylricinolate esters (for example, methyl acetylricinolate); trimellitate esters such as tris(2-ethylhexyl) trimellitate; pyromellitate esters; trimethylolpropane tribenzoate; dipentaerythritol; polycaprolactone; alkyl p-hydroxybenzoates; polyethylene glycol and esters thereof; polyglycerol acetates; epoxidized oils such as epoxidized soybean oil, epoxidized linseed oil and epoxidized linseed oil fatty acid butyl esters; tributyl acetylcitrate; and fatty acid esters such as sucrose fatty acid esters and sorbitan fatty acid esters. Among these, esters of aliphatic dibasic acids are preferable, and examples thereof include dialkyl adipates such as dibutyl adipate, diisobutyl adipate, bis(2-ethylhexyl) adipate, diisonolyl adipate, diisodecyl adipate, bis[2-(2-butoxyethoxy)ethyl] adipate and bis[2-(2-butoxyethoxy)ethyl] adipate; esters of adipic acid with mixed groups (esters of the dibasic acid with two or more alcohols or ether alcohols); dialkyl azelates such as bis(2-ethylhexyl) azelate; dialkyl sebacates such as dibutyl sebacate and bis(2-ethylhexyl) sebacate; and dialkyl succinates such as diethyl succinates.

The plasticizer is preferably esters of a dibasic acid with mixed groups (for example, an ester of a dibasic acid with two or more alcohols or/and ether alcohols), particularly esters of an aliphatic dibasic acid with mixed groups. The alcohols to form the esters with mixed groups include lower aliphatic alcohols having 1 to 7 carbon atoms such as butanol, pentanol and hexanol, and higher aliphatic alcohols having 8 to 22 carbon atoms, and aromatic alcohols such as benzyl alcohol; and the ether alcohols include alkylene glycol compounds including ethylene glycol compounds (or propylene glycol compounds) such as diethylene glycol monomethyl ether, diethylene glycol monoethyl ether and diethylene glycol monobutyl ether. The dibasic acid is preferably aliphatic dibasic acids, and preferably aliphatic dibasic acids having 4 to 10 carbon atoms, including succinic acid, glutaric acid, adipic acid, azelaic acid and zebacic acid; and adipic acid is more preferable. One example of structural formulae thereof is shown below.

[Formula 6]

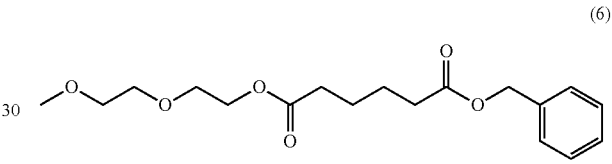

(6)

(Other Components)

The polylactic acid resin composition and the polyester resin composition according to the exemplary embodiments of the first and second means may comprise, in the range of not inhibiting their function, various types of additives such as crystal nucleating agents, thermal stabilizers, antioxidants, colorants, fluorescent whitening agents, fillers, mold release agents, softening materials and antistatic agents, impact resistance improving agents, heat-absorbing agents such as metal hydroxides and borate salts, nitrogen compounds such as melamine, halogen-containing flame retardants, and the like.

(Crystal Nucleating Agent)

In the case where the polylactic acid resin composition and the polyester resin composition according to the exemplary embodiments of the first and second means comprise a crystalline resin, in molding molded articles, in order to more promote crystallization of amorphous contents, which have low flow beginning temperatures, use of a crystal nucleating agent is preferable. The crystal nucleating agent itself, in molding molded articles, makes crystal nuclei, which act so that the constituting molecules of the resin are arranged in a regular three-dimensional structure and can achieve the improvements in moldability of the molded articles, the shortening of the molding time, the improvements in the mechanical strength and the heat resistance. Further the crystal nucleating agent, since promoting the crystallization of amorphous contents, even in the case where the mold temperature in molding is high, suppresses deformation of the molded articles, which can make easy the mold release after molding. Even in the case where the mold temperature is higher than the glass transition temperature (Tg) of the resin, the same effect can be attained.

The crystal nucleating agent includes inorganic ones and organic ones.

As the inorganic crystal nucleating agent, there can be used talc, calcium carbonate, mica, boron nitride, synthetic silicic acid, silicate, silica, kaolin, carbon black, zinc white, montmorillonite, clay mineral, basic magnesium carbonate, quartz powder, glass fiber, glass powder, diatomite, dolomite powder, titanium oxide, zinc oxide, antimony oxide, barium sulfate, calcium sulfate, alumina, calcium silicate, boron nitride, and the like.

Examples of the organic crystal nucleating agent include:
(1) organic carboxylic acids: octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, monomethyl terephthalate, isophthalic acid, monomethyl isophthalate, rosin acid, 12-hydroxystearic acid, cholic acid, and the like;
(2) organic carboxylic acid alkali metal salts and organic carboxylic acid alkali earth metal salts: alkali metal salts and alkaline earth metal salts of the organic carboxylic acids, and the like;
(3) polymeric organic compounds having a metal salt of a carboxyl group: metal salts of carboxyl group-containing polyethylenes obtained by oxidation of polyethylene, carboxyl group-containing polypropylenes obtained by oxidation of polypropylene, copolymers of olefins such as ethylene, propylene, butene-1 and the like with acrylic acid or methacrylic acid, copolymers of styrene with acrylic acid or methacrylic acid, copolymers of olefins with maleic anhydride, copolymers of styrene with maleic anhydride, and the like;
(4) aliphatic carboxylic acid amides: oleic acid amide, stearic acid amide, erucic acid amide, behenic acid amide, N-oleylpalmitoamide, N-stearylerucic acid amide, N,N'-ethylenebis(stearoamide), N,N'-methylenebis(stearoamide), methylolstearoamide, ethylenebisoleic acid amide, ethylenebisbehenic acid amide, ethylenebisstearic acid amide, ethylenebislauric acid amide, hexamethylenebisoleic acid amide, hexamethylenebisstearic acid amide, butylenebisstearic acid amide, N,N'-dioleylsebacic acid amide, N,N'-dioleyladipic acid amide, N,N'-distearyladipic acid amide, N'-distearylsebacic acid amide, m-xylylenebisstearic acid amide, N,N'-distearylisophthalic acid amide, N,N'-distearylterephthalic acid amide, N-oleyloleic acid amide, N-stearyloleic acid amide, N-stearylerucic acid amide, N-oleylstearinamide, N-stearylstearic acid amide, N-butyl-N'-stearylurea, N-propyl-N'-stearylurea, N-allyl-N'-stearylurea, N-phenyl-N'-stearylurea, N-stearyl-N'-stearylurea, dimethyl tall oil amide, dimethyllauric acid amide, dimethylstearic acid amide, N,N'-cyclohexanebis(stearoamide), N-lauroyl-L-glutamic acid-α-γ-n-butylamide, and the like;
(5) polymeric organic compounds: 3-position-branched α-olefins having 5 or more carbon atoms such as 3,3-dimethylbutene-1,3-methylbutene-1,3-methylpentene-1,3-methylhexene-1,3,5,5-trimethylhe xene-1, polymers of vinylcycloalkanes such as vinylcyclopentane, vinylcyclohexane and vinylnorbornane, polyalkylene glycols such as polyethylene glycol and polypropylene glycol, polyglycolic acid, cellulose, cellulose esters, cellulose ethers, polyester, polycarbonate, and the like;
(6) organic compounds of phosphoric acid or phosphorous acid, and metal salts thereof: diphenyl phosphate, diphenyl phosphite, bis(4-tert-butylphenyl) sodium phosphate, methylene(2,4-tert-butylphenyl) sodium phosphate, and the like;
(7) sorbitol derivatives such as bis(p-methylbenzylidene) sorbitol and bis(p-ethylbenzylidene) sorbitol;
(8) cholesterol derivatives such as cholesteryl stearate and cholesteryloxystearamide;
(9) thioglycolic anhydride, paratoluenesulfonic acid, paratoluenesulfonic acid amide, metal salts thereof, and the like; and
(10) phenylphosphonic acid, metal salts thereof, and the like.

Among these, crystal nucleating agents composed of a neutral substance not promoting hydrolysis of polyester are preferable because the decreasing of the molecular weight of the polylactic acid resin (or the polyester resin) undergoing hydrolysis can be suppressed. Then in order to suppress the reduction in molecular weight by the transesterification of the polylactic acid resin (or the polyester resin), esters and amide compounds which are derivatives of crystal nucleating agents are better than crystal nucleating agents having a carboxyl group; and similarly, esters and ether compounds which are derivatives of crystal nucleating agents are better than crystal nucleating agents having a hydroxyl group.

It is preferable that the inorganic crystal nucleating agent be a lamellar compound such as talc, which is codissolved or finely dispersed in a resin in a high-temperature melt state in injection molding or the like, is deposited or phase-separated in a molding cooling stage in a mold, and acts as a crystal nucleating agent.

With respect to the crystal nucleating agent, an inorganic crystal nucleating agent and an organic crystal nucleating agent may be concurrently used, or a plurality of kinds thereof can also be combined and used. The content of the crystal nucleating agent, with respect to the polylactic acid resin composition in the case of the exemplary embodiment of the first means (with respect to the polyester resin composition in the case of the exemplary embodiment of the second means), can be set in the range of 0.1% by mass to 20% by mass, and can also be set in the range of 0.1% by mass to 10% by mass, and is preferably in the range of 0.2% by mass to 2% by mass.

(Thermal Stabilizer and Antioxidant)

Examples of the thermal stabilizer and the antioxidant include hindered phenols, phosphorus compounds, hindered amines, sulfur compounds, copper compounds, halides of alkali metals and vitamin E. These are used, with respect to the polylactic acid resin (or the polyester resin), preferably in the range of 0.5% by mass or less.

(Filler)

Examples of the filler include glass beads, glass flakes, talc powder, clay powder, mica, wollastonite powder and silica powder.

(Impact Resistance Improving Material)

As the impact resistance improving material, soft components can be used. Examples of the soft components include polymer blocks (copolymers) of polyester segments, polyether segments and polyhydroxycarboxylic acid segments, block copolymers made by mutually binding polylactic acid segments, aromatic polyester segments and polyalkylene ether segments, block copolymers composed of polylactic acid segments and polycaprolactone segments, polymers having an unsaturated alkyl carboxylate unit as their main component, aliphatic polyesters such as polybutylene succinate, polybutylene succinate adipate, polyethylene succinate, polycaprolactone, polyethylene adipate, polypropylene adipate, polybutylene adipate, polyhexene adipate and polybutylene succinate adipate, and adipic acid-based aliphatic polyesters.

(Other Resin Components)

The polylactic acid resin composition according to the exemplary embodiment of the first means and the polyester resin composition according to the exemplary embodiment of the second means may further comprise, as required, other thermoplastic resins, such as polybutylene succinate, polybutylene succinate adipate, polypropylene, polystyrene, ABS, nylon, polyethylene terephthalate, polybutylene terephthalate, polycarbonate and alloys thereof.

As thermoplastic resins having crystallinity, it is preferable that there be used polybutylene succinate, polybutylene succinate adipate, polypropylene, nylon, polyethylene terephthalate, polybutylene terephthalate, alloys thereof with the polylactic acid resin or the polyester compound, and the like.

Further, the polylactic acid resin composition according to the exemplary embodiment of the first means and the polyester resin composition according to the exemplary embodiment of the second means may further comprise a thermosetting resin such as phenol resins, urea resins, melamine resins, alkyd resins, acrylate resins, unsaturated polyester resins, diallyl phthalate resins, epoxy resins, silicone resins, cyanate resins, isocyanate resins, furan resins, ketone resins, xylene resins, thermosetting polyimides, thermosetting polyamides, styrylpyridine resins, nitrile-terminated resins, addition-curable quinoxalines and addition-curable polyquinoxaline resins, and thermosetting resins using plants as raw materials, such as lignin, hemicellulose and cellulose. In the case of using the thermosetting resin, it is preferable to use a curing agent and a curing accelerator necessary for the curing reaction.

(Reinforcing Fiber)

The polylactic acid resin composition according to the exemplary embodiment of the first means and the polyester resin composition according to the exemplary embodiment of the second means may further comprise a reinforcing fiber.

In the reinforcing fiber, the free moisture amount is preferably 0.1% or smaller. Here, the free moisture amount is an amount calculated from a weight increment of the reinforcing fiber after being left to stand at 25° C. at a humidity of 95% for 24 hours based on a weight of the reinforcing fiber after being dried in an oven at 100° C. for 12 hours. When the free moisture amount is 0.1% or smaller, the polarity of the surface of the reinforcing fiber is low and the surface becomes hydrophobic.

The reinforcing fiber may comprise fibers such as inorganic fibers, organic synthetic fibers and natural fibers originated from plants. The inorganic fibers include metal fibers, glass fibers, metal silicate fibers, inorganic oxide fibers and inorganic nitride fibers. The organic synthetic fibers include polyamide fibers and polyarylate fibers. Inorganic fibers are preferable from the viewpoint of the heat resistance and the like; then glass fibers are especially preferable from the viewpoint of being high in heat resistance and inexpensive.

The reinforcing fiber may be used singly or as a mixture of two or more. Two or more of inorganic fibers, organic synthetic fibers and natural fibers originated from plants may be mixed and used; and it is preferable that the reinforcing fiber comprise at least an inorganic fiber. The incorporation of the reinforcing fiber enables the heat distortion preventing effect and the drip suppressing effect of molded articles to be attained.

The shape of the reinforcing fiber may be circular in fiber cross-section, but may be a polygonal, indeterminate or uneven shape. From the viewpoint of making large the joining area with the resin, the shape having unevenness high in aspect ratio and the shape having a small fiber diameter are desirable.

The reinforcing fiber, in order to enhance the affinity for a resin to become a base material or the entanglement of the fibers, as required, can be subjected to a surface treatment. As a surface treatment method, there are effective a treatment with a coupling agent of silane, titanate or another type, a treatment with a surface treatment agent including a treatment with an alkyl phosphate-type surfactant, a treatment with ozone or plasma, and the like. In the case of using a glass fiber as the reinforcing fiber, it is preferable that the glass fiber have been treated with a surface treatment agent. It is preferable, from the viewpoint of being excellent in bleed resistance, that the surface treatment agent comprise, as its main component, at least one resin selected from polyolefin resins and resins having an epoxy group as its functional group.

Then, in the case of using a fiber high in the interfacial adhesivity (affinity) with the polylactic acid resin, there is such a possibility that not only bleeding of a flame retardant such as a phosphorus-containing compound is promoted, but also the flowability of the polylactic acid resin composition is lowered in injection molding. On the other hand, in the case of using a fiber remarkably low in the interfacial adhesivity (affinity) with the polylactic acid resin, although the bleed resistance and the flowability are improved as compared with the fiber high in the interfacial adhesivity, there is such a possibility that the mechanical strengths such as the strength and the impact resistance decrease. Hence, it is preferable that the fiber have suitable interfacial adhesivity.

The average fiber length (number-average fiber length excluding fiber debris) of the reinforcing fiber is preferably in the range of 0.1 mm to 20 mm, and more preferably in the range of 0.1 mm to 10 mm. Further it is preferable that the reinforcing fiber comprise fibers having a fiber length of 300 m to 20 mm. The content of the reinforcing fiber is not especially limited, but based on the whole polylactic acid resin composition in the case of the exemplary embodiment of the first means (based on the whole polyester resin composition in the case of the exemplary embodiment of the second means), can be set at 1% by mass or higher and 30% by mass or lower. From the viewpoint of attaining a sufficient addition effect, the content is preferably 2% by mass or higher, and more preferably 3% by mass or higher. Further from the viewpoint of sufficiently securing the moldability and the mechanical strength of the resin composition, the content is preferably 20% by mass or lower, and more preferably 10% by mass or lower.

(Production Method of the Polylactic Acid Resin Composition According to the First Means)

The polylactic acid resin composition according to the exemplary embodiment of the first means can be produced, for example, as follows. That is, first, the polylactic acid resin, the aliphatic polyester resin, the carbodiimide compound, the metal hydrate and as required, other additives are mixed and stirred. The mixing and stirring can use an apparatus similar to an apparatus described later imparting a shearing force in production of the polylactic acid resin. The mixing and stirring can be carried out, for example, by a kneading extruder; the above mixture is melt kneaded, and extruded, for example, into strands, and cut into chips or pellets, whereby the polylactic acid resin composition can be obtained as a molding material.

With regard to the polylactic acid resin, the polylactic acid compound may be mixed as the polylactic acid resin component.

Further the polylactic acid resin may be formed as a reaction product of the polylactic acid compound with the amino group-containing polysiloxane compound in the mixing step.

The polylactic acid resin can be obtained, for example, by blending the amino group-containing polysiloxane compound and the polylactic acid compound in such proportions that the proportion of the amino group becomes a predetermined one, and mixing and stirring the mixture thereof while a shearing force is applied in a melt state. Then, in order to securely react the polylactic acid compound with the amino group-containing polysiloxane compound, it is allowed that before the other components (additives and the like) are mixed, these compounds are mixed and stirred while a shearing force is applied in a melt state and made into a masterbatch thereof, and thereafter melt kneaded together with the other components (additives and the like).

(Production Method of the Polyester Resin Composition According to the Second Means)

The polyester resin composition according to the exemplary embodiment of the second means can be produced, for example, as follows.

That is, first, the polyester compound (the polylactic acid compound and the aliphatic polyester resin), the amino group-containing polysiloxane compound, the phosphorus-containing flame retardant, the metal hydrate, the fluorine-containing polymer and as required, other additives are mixed and stirred. The mixing and stirring can use an apparatus similar to an apparatus described later imparting a shearing force in production of the polysiloxane-mixed polyester resin (R). The mixing and stirring can be carried out, for example, by a kneading extruder; the above mixture is melt kneaded, and extruded, for example, into strands, and cut into chips or pellets, whereby the polyester resin composition can be obtained as a molding material.

The polysiloxane-mixed polyester resin (R) can be obtained, for example, by blending the amino group-containing polysiloxane compound (C) and the polyester compound (P) in such proportions that the proportion of the amino group becomes a predetermined one, and mixing and stirring the mixture thereof while a shearing force is applied in a melt state. Then, in order to securely react the polyester compound (P) (for example, particularly the polylactic acid compound (A)) with the amino group-containing polysiloxane compound (C), it is allowed that before the other components such as additives are mixed, these compounds are mixed and stirred while a shearing force is applied in a melt state and made into a masterbatch thereof, and thereafter melt kneaded together with the other components (additives and the like).

In the production methods of the resin compositions according to the exemplary embodiments of the first and second means, in order to impart a shearing force to the melted polylactic acid compound (or polyester compound) and amino group-containing polysiloxane compound, there can be used an apparatus, for example, a roll, an extruder, a kneader or a batch-type kneader having a reflux device. With respect to the extruder, it is preferable, from the viewpoint of making easy the supply of raw materials and the taking-out of products, to adopt a single-screw or multi-screw extruder with a vent. The temperature in the shearing is a temperature equal to or higher than the melt flow temperature of the polylactic acid compound (or the polyester compound) of the raw material, and preferably made to be a temperature higher by 10° C. than the melt flow temperature and equal to or lower than the decomposition temperature. The melt shearing time is, for example, preferably in the range of 0.1 min to 30 min, and more preferably in the range of 0.5 min to 10 min. When the melt shearing time is 0.1 min or longer, the reaction of the polylactic acid compound (or the polyester compound) with the amino group-containing polysiloxane compound can sufficiently be carried out. When the melt shearing time is 30 min or shorter, the decomposition of the obtained polylactic acid resin (or polysiloxane-mixed polyester resin) can be suppressed. The temperature in the shearing is, in the case where another resin such as the polyester resin is added, preferably a temperature equal to or higher than the melting temperature of the resin and equal to or higher than the melt flow temperature of the polylactic acid compound, and preferably a temperature equal to or lower than the decomposition temperature of the another resin and equal to or lower than the decomposition temperature of the polylactic acid compound.

The polylactic acid compound can be produced by a melt polymerization method, or a combined use of a melt polymerization method and a solid-phase polymerization method. In these methods, with respect to a method of regulating the melt flow rate of the polylactic acid compound in a predetermined range, in the case where the melt flow rate is too high, there can be used a method of increasing the molecular weight of the resin by using a small amount of a chain extender such as a diisocyanate compound, an epoxy compound, an acid anhydride or the like. Further in the case where the melt flow rate is too low, there can be used a method of being mixed with a biodegradable polyester resin having a high melt flow rate and a low-molecular weight compound.

(Molded Article)

According to the exemplary embodiment of the first means, there can be obtained a molded article molded by using the polylactic acid resin composition. According to the exemplary embodiment of the second means, there can be obtained a molded article molded by using the polyester resin composition. As a molding method of these molded articles, there can be used, for example, injection molding, injection compression molding, extrusion or die molding. Particularly from the viewpoint of providing a high heat resistance by a fibrillary structure in the molded articles, preferable are molded articles undergoing a molding process using injection or extrusion. Promotion of crystallization during the production step or after the molding is preferable because molded articles excellent in impact resistance and mechanical strength can be obtained. A method of promoting the crystallization includes a method of using the above-mentioned crystal nucleating agent in the above-mentioned range.

Such molded articles are high in flame retardancy and excellent in impact resistance, flexibility and mechanical strength and suppressed in deterioration due to bleeding, and are suitable for various types of electric and electronic components and components of cars and the like. Such molded articles are suitable particularly for components (for example, outer packages, interior components) of household appliances and electronic devices (for example, copying machines) requiring high flame retardancy and excellent impact resistance and flexibility.

EXAMPLES

Then, Examples of the present invention will be described together with Comparative Examples. Here, the present invention is not limited and restricted by the following Examples and Comparative Examples. Details of raw materials used in Examples and Comparative Examples of the present invention were as follows.

1. A polylactic acid compound (PLA) (A): manufactured by NatureWorks LLC, product name: INGEO 3251D (melting point: 170° C.)

2. Aliphatic polyester resins (B)
As aliphatic polyester resins, the following were used.
A polybutylene succinate adipate (PBSA): manufactured by Showa Denko K.K., product name: Bionole (3001MD); and
A polybutylene succinate adipate (PBSA-2): manufactured by Mitsubishi Chemical Corp., product name: GS Pla (BioPBS FD92PM)

3. An amino group-containing polysiloxane compound (C)
As an amino group-containing polysiloxane compound (C), the following was used.
C1-4: a side-chain di-amino-type polysiloxane compound (manufactured by Dow Corning Toray Co., Ltd., product name: FZ-3705)
(viscosity (25° C.): 230 mm2/s, amino equivalent: 4,000 (g/mol), content of amino groups: 0.40% by mass)
Here, the amino group-containing polysiloxane compound can be produced, for example, according to descriptions in SILICONE HANDBOOK, The Nikkan Kogyo Shinbun, Ltd (1990), p. 165. It can be synthesized, for example, by using a siloxane oligomer obtained by hydrolysis of an aminoalkylmethyldimethoxysilane and a cyclic siloxane and a basic catalyst.

4. An organic crystal nucleating agent (E)
As an organic crystal nucleating agent, the following was used.
E: zinc phenylphosphonate (manufactured by Nissan Chemical Industries, Ltd., trade name: Ecopromote)

5. A plasticizer (F)
As a plasticizer (F), the following was used.
F: manufactured by Daihachi Chemical Industry Co., Ltd., product name: DAIFATTY-101 (a reaction product containing a mixed group ester of an aliphatic dibasic acid: benzyl=2-(2-methoxyethoxy)ethyl=adipate (formula (6)) as its main component)

6. Phosphorus-containing flame retardants (G)
As phosphorus-containing flame retardants (G), the following were used.
G-1: a condensed phosphate ester: 1,3-phenylene bis(di-2,6-xylenylphosphate) (manufactured by Daihachi Chemical Industry Co., Ltd., product name: PX-200)
G-2: a cyclic phenoxyphosphazene (manufactured by Otsuka Chemical Co., Ltd., product name: SPS-100)

7. Metal hydrates (I)
As metal hydrates (I), the following were used.
I-1: an aluminum hydroxide (manufactured by Nippon Light Metal Co., Ltd., product name: BE023)
(average particle diameter: 3.1 μm, composition: $Al(OH)_3$ (99.94%), $SiO_2$ (0.01%), $Fe_2O_3$ (0.01%), $Na_2O$ (0.04%, an alkali metal substance))
I-2: a 1%-isocyanate silane coupling agent-treated aluminum hydroxide (manufactured by Nippon Light Metal Co., Ltd., product name: BE023-STI)
(average particle diameter: 3.1 μm, composition: $Al(OH)_3$ (99.94%), $SiO_2$ (0.01%), $Fe_2O_3$ (0.01%), $Na_2O$ (0.04%, an alkali metal substance))
(the amount of the silane coupling agent with respect to the aluminum hydroxide before the treatment: 1% by mass)
I-3: a 1.3%-aminosilane coupling agent-treated aluminum hydroxide (average particle diameter: 3.1 μm, composition: $Al(OH)_3$ (99.94%), $SiO_2$ (0.01%), $Fe_2O_3$ (0.01%), $Na_2O$ (0.04%, an alkali metal substance))
(the amount of the silane coupling agent with respect to the aluminum hydroxide before the treatment: 1.3% by mass)
The I-3 was fabricated as follows.
An aluminum hydroxide (product name: BE023), manufactured by Nippon Light Metal Co., Ltd., was previously stirred in a Supermixer; and an aminosilane coupling agent (product name: KBE-903), manufactured by Shin-Etsu Chemical Co., Ltd., was sprayed thereto in 1.35% by mass with respect to the aluminum hydroxide, and then dried to thereby obtain the 1-3.
I-4: a 1.3%-ureidosilane coupling agent-treated aluminum hydroxide (average particle diameter: 3.1 μm, composition: $Al(OH)_3$ (99.94%), $SiO_2$ (0.01%), $Fe_2O_3$ (0.01%), $Na_2O$ (0.04%, an alkali metal substance))
(the amount of the silane coupling agent with respect to the aluminum hydroxide before the treatment: 1.3% by mass)
The I-4 was fabricated as follows.
An aluminum hydroxide (product name: BE023), manufactured by Nippon Light Metal Co., Ltd., was previously stirred in a Supermixer; and a ureidosilane coupling agent (product name: KBE-585, an alcohol solution, content of the silane coupling agent: about 45% by mass), manufactured by Shin-Etsu Chemical Co., Ltd., was sprayed thereto in 2.5% by mass with respect to the aluminum hydroxide, and then dried to thereby obtain the 1-4.
I-5: an epoxysilane coupling agent-treated aluminum hydroxide (manufactured by Nippon Light Metal Co., Ltd., product name: BE023-STE)
(average particle diameter: 3.1 μm, composition: $Al(OH)_3$ (99.94%), $SiO_2$ (0.01%), $Fe_2O_3$ (0.01%), $Na_2O$ (0.04%, an alkali metal substance))
(the amount of the silane coupling agent with respect to the aluminum hydroxide before the treatment: 1% by mass)
I-6: a methachryloxysilane coupling agent-treated aluminum hydroxide (manufactured by Nippon Light Metal Co., Ltd., product name: BE023-STM)
(average particle diameter: 3.1 μm, composition: $Al(OH)_3$ (99.94%), $SiO_2$ (0.01%), $Fe_2O_3$ (0.01%), $Na_2O$ (0.04%, an alkali metal substance))
(the amount of the silane coupling agent with respect to the aluminum hydroxide before the treatment: 1% by mass)
I-7: a vinylsilane coupling agent-treated aluminum hydroxide (manufactured by Nippon Light Metal Co., Ltd., product name: BE023-STV)
(average particle diameter: 3.1 μm, composition: $Al(OH)_3$ (99.94%), $SiO_2$ (0.01%), $Fe_2O_3$ (0.01%), $Na_2O$ (0.04%, an alkali metal substance))
(the amount of the silane coupling agent with respect to the aluminum hydroxide before the treatment: 1% by mass)
I-8: a stearic acid-treated aluminum hydroxide (manufactured by Nippon Light Metal Co., Ltd., product name: BE023-S)
(average particle diameter: 3.1 μm, composition: $Al(OH)_3$ (99.94%), $SiO_2$ (0.01%), $Fe_2O_3$ (0.01%), $Na_2O$ (0.04%, an alkali metal substance))
(the amount of the stearic acid with respect to the aluminum hydroxide before the treatment: 1% by mass)

8. A fluorine-containing polymer (J)
As a fluorine-containing polymer (J), the following was used.
J: a polytetrafluoroethylene (manufactured by Daikin Industries, Ltd., product name: Polyfuron MPA FA-500H)

9. Carbodiimide compounds (K)
As carbodiimide compounds (K), the following were used.

K-1: a polycarbodiimide-based modifier (manufactured by Nisshinbo Chemical Inc., trade name: Carbodilite LA-1)

K-2: a poly(1,3-5-triisopropylphenylenecarbodiimide) (manufactured by Rhein Chemie Rheinau GmbH, trade name: Stabaxol P)

10. A glass fiber (L)

As a glass fiber (L), the following was used.

L: manufactured by Owens Corning Japan LLC, trade name: 03JAFT792

Examples 1 to 15 and Comparative Examples 1 to 17, and Examples 16 to 27

There were dry blended the polylactic acid compound (PLA), and as required, the aliphatic polyester resin (PBSA, PBSA-2), the organic crystal nucleating agent (E), the phosphorus-containing flame retardant (G), the metal hydrate (I), the fluorine-containing polymer (J), the carbodiimide compound (K), the plasticizer (F), the amino group-containing polysiloxane compound (C) and the glass fiber (L), in blend ratios (mass ratios) indicated in Tables 2 to 7 and Tables 8 and 9.

Here, as Examples indicating the flame retardancy effect (5VB) according to the exemplary embodiment of the second means, Examples 18 to 22 and Contrast Examples (Examples 16 and 17) are shown in Table 8, and Examples 20 and 24 to 27 and a Contrast Example (Example 23) are shown in Table 9. In these Examples, there were dry blended the polyester compound (P) (the polylactic acid compound (PLA) and the aliphatic polyester resin (PBSA or PBSA-2), the amino group-containing polysiloxane compound (C), the phosphorus-containing flame retardant (G), the metal hydrate (I) and the fluorine-containing polymer (J), and further the organic crystal nucleating agent (E), the plasticizer (F) and the carbodiimide compound (K), and as required, further the glass fiber (L), in mixing ratios indicated in Tables 8 and 9.

The obtained mixtures were each supplied from the hopper gate of a continuous kneading extruder (ZE40A× 40D, L/D=40, screw diameterφ=40, manufactured by KraussMaffei Berstorff GmbH) set at a cylinder temperature of 200° C., and as required, further the amino group-containing polysiloxane compound (C1-4) was charged in a blend ratio indicated in Tables 2 to 7 and Tables 8 and 9 separately from the vent hole so that the total of their supply amounts per 1 hour became 15 to 20 kg. The mixture was mixed and stirred under melt shearing by rotating the screw at 150 rpm; thereafter, the plasticizer (F) was liquid-injected and further mixed and stirred under melt shearing; and thereafter, (in the case where the glass fiber (L) was blended, the glass fiber (L) was supplied from a side feeder fixed on the continuous kneading extruder and mixed and stirred, and thereafter) the resultant was extruded as strands from the die mouth of the extruder, cooled in water, and thereafter cut into pellets to thereby obtain pellets of the polylactic acid resin composition.

The obtained pellets were dried at 100° C. for 5 hour, and thereafter molded into specimens (125 mm×13 mm×1.6 mm, 62.5 mm×13 mm×3.2 mm, 127 mm×12.7 mm×3 mm) by using an injection molding machine (EC20P-0.4A, manufactured by Toshiba Machine Co., Ltd., molding temperature: 200° C., mold temperature: 90° C., mold holding time: 90 sec); and the evaluation of the flame retardancy, and the evaluations of the Izod impact strength and bending properties (bending strength, bending elastic modulus, bending breaking strain) were carried out according to the following methods. The results are shown in Tables 2 to 7 and Tables 8 and 9. Further the evaluation results of the deflection temperature under load are shown in Tables 8 and 9.

(Flame Retardancy Evaluation UL94V)

The flame retardancy evaluation UL94V was carried out, after a specimen (125 mm×13 mm×1.6 mm) for the flame retardancy evaluation obtained by injection molding was conditioned in a thermostatic chamber at a temperature of 23° C. and at a humidity of 50% for 48 hours, according to the UL94 testing (test for flammability of plastic materials for parts in devices and appliances) released by Underwriters Laboratories.

UL94V refers to a method of evaluating flame retardancy from the afterflame time, the dripping property and the like of a specimen after a flame of a burner is applied to the vertically held specimen of a predetermined size for 10 sec, and the evaluation is classified into Classes indicated in the following Table 1-1.

TABLE 1-1

| Conditions of Criteria | V-0 | V-1 | V-2 |
|---|---|---|---|
| Afterflame time of each sample t1 and t2 | ≤10 sec | ≤30 sec | ≤30 sec |
| Total of afterflame times of 5 sheets of each sample (Total of t1 + t2 of the 5 sheets of the specimen) | ≤50 sec | ≤250 sec | ≤250 sec |
| Total of an afterflame time and an afterglow time of each sample after the second-time flame application (t2 + t3) | ≤30 sec | ≤60 sec | ≤60 sec |
| Afterflaming or afterglowing up to the holding clamp of each sample | absent | absent | absent |
| Ignition of the marking cotton by drips | absent | absent | present |

Here, in the case of assuming some combustion form other than the above classification, the evaluation was classified as notV-2. The evaluation results were indicated as V-0, V-1 and (V-2 or notV-2) in the order of poorer flame retardancy.

The afterflame time is a time length in which flaming combustion of the specimen persists after the ignition source is removed, and t1 is the afterflame time after the first-time flame application; t2 is the afterflame time after the second-time flame application; and t3 is an afterglow (non-flaming combustion) time after the second-time flame application. The second-time flame application is carried out by applying a flame of the burner to the specimen immediately after the flame goes out after the first-time flame application, for 10 sec. Then, the ignition of the cotton by the dripping is determined by whether the marking cotton placed about 300 mm below the lower end of the specimen is ignited by drips from the specimen.

(Flame Retardancy Evaluation UL94-5V)

The flame retardancy evaluation UL94-5V was carried out, after a specimen (125 mm×13 mm×1.6 mm) for the flame retardancy evaluation obtained by injection molding is conditioned in a thermostatic chamber at a temperature of 23° C. and at a humidity of 50% for 48 hours, according to the UL94-5V testing (125-mm vertical combustion test) released by Underwriters Laboratories.

UL94-5V is a method in which a specimen is vertically attached to a clamp; flame application by a 125-mm flame is 5 times carried out for 5 sec; and the flame retardancy is judged by the combustion behavior, and the flame retardancy is classified into the following Classes indicated in Table 1-2. The UL94-5V test was carried out for materials conforming to the V-0 or V-1 ranking. Here, in the present evaluation, the test for "5V-A" (presence/absence of burnthroughs after flame application) was not carried out and the case of meeting at least the criterion for 5V-B was judged as "5VB".

TABLE 1-2

| Criteria | Flammability Classification | |
|---|---|---|
| | 5V-A | 5V-B |
| Flame + glow time after the fifth-time flame application to each strip specimen | 60 sec or shorter | 60 sec or shorter |
| Ignition of the cotton by drips from the strip specimen | absent | absent |
| Presence/absence of burnthroughs after flame application (plaque specimen) | absent | present |

(Evaluations of the Izod Impact Strength and the Bending Properties)

A specimen was conditioned in a thermostatic chamber at 110° C. for 1 hour to thereby completely crystallize the specimen, thereafter returned to room temperature, and evaluated for the Izod impact strength and the bending properties. A specimen (62.5 mm×13 mm×3.2 mm) was notched and the measurement of the Izod impact strength was carried out according to JIS K7110. The bending properties were evaluated by using a universal testing machine (manufactured by Instron Corp., 5567) according to ASTM D790.

(Deflection Temperature Under Load)

The deflection temperature under load was according to the JIS K7191-2-2007 annex; the oil temperature was raised at a constant rate (120° C./h), and a specified bending stress was applied to a strip specimen (127×12.7×3 mm) and a temperature at which the specimen reached a prescribed deflection amount was defined as a deflection temperature under load.

The measurement condition was as follows.

Way of setting: edgewise

Bending stress: 1.80 MPa (high load), 0.45 MPa (low load)

Distance between fulcrums: 100 mm

Temperature-rise rate: 120° C./h

Heat medium: a silicone oil

TABLE 2

| | Example 1 | Example 2 | Example 3 | Example 12 | Comparative Example 1 | Comparative Example 2 |
|---|---|---|---|---|---|---|
| PLA | 41.20% | 41.20% | 38.40% | 41.60% | 51.50% | 51.50% |
| PBSA | 10.30% | 10.30% | 9.60% | 10.40% | — | — |
| I-3 | 42.50% | — | 42.50% | — | 42.50% | — |
| I-4 | — | 42.50% | — | 40.00% | — | 42.50% |
| G-1 | 2.00% | 2.00% | 2.00% | 2.00% | 2.00% | 2.00% |
| G-2 | 2.00% | 2.00% | 2.00% | 2.00% | 2.00% | 2.00% |
| E (crystal nucleating agent) | 0.50% | 0.50% | 0.50% | 0.50% | 0.50% | 0.50% |
| F (plasticizer) | — | — | 1.50% | — | — | — |
| K-1 | 0.50% | 0.50% | 0.50% | 0.50% | 0.50% | 0.50% |
| K-2 | 0.50% | 0.50% | 0.50% | 0.50% | 0.50% | 0.50% |
| C1-4 | — | — | 2.00% | 2.00% | — | — |
| J (fluorine-containing polymer) | 0.50% | 0.50% | 0.50% | 0.50% | 0.50% | 0.50% |
| UL94V (1.6 mmt) | V-0 | V-0 | V-0 | V-0 | V-0 | V-0 |
| Izod Impact Strength (kJ/m$^2$) | 8.3 | 8.7 | 6.9 | 9.2 | 3.1 | 3.4 |
| Bending Strength (MPa) | 81.8 | 77.9 | 67.8 | 61.4 | 102.0 | 95.0 |
| Bending Elastic Modulus (GPa) | 4.5 | 4.2 | 4.7 | 3.5 | 7.1 | 7.0 |
| Bending Breaking Strain (%) | 6.6 | 6.9 | >10 | >10 | 1.9 | 1.6 |

As shown in Table 2, it was found from the results of Examples 1 and 2 that the polylactic acid resin compositions of the polylactic acid compound (PLA) blended with the aliphatic polyester resin (PBSA), the carbodiimide compounds (K-1, 2) and the metal hydrate (I-3, 4) surface-treated with a silane coupling agent had a high flame retardancy of V-1 or higher and simultaneously were excellent in the impact strength and the bending breaking strain.

By contrast, it was found from Comparative Examples 1 and 2 that the polylactic acid resin compositions comprising no aliphatic polyester resin (PBSA), though having a high flame retardancy of V-1 or higher, were very low in the impact strength and the bending breaking strain.

It was further found from the results of Examples 3 and 12 that the polylactic acid resin compositions of the polylactic acid compound (PLA) blended with the amino group-containing polysiloxane compound (C1-4), the aliphatic polyester resin (PBSA), the carbodiimide compounds (K-1, 2) and the metal hydrate (1-3, 4) surface-treated with a silane coupling agent had a high flame retardancy of V-1 or higher and simultaneously were excellent in the impact strength and the bending breaking strain.

TABLE 3

|  | Comparative Example 3 | Comparative Example 4 | Example 4 | Example 5 | Example 6 | Example 7 | Example 8 |
|---|---|---|---|---|---|---|---|
| PLA | 100% | 39.60% | 38.80% | 38.80% | 38.80% | 33.95% | 35.20% |
| PBSA | — | 9.90% | 9.70% | 9.70% | 9.70% | 14.55% | 8.80% |
| I-2 | — | 42.50% | 42.50% | 42.50% | 42.50% | 42.50% | 45.0% |
| G-1 | — | 2.00% | 2.00% | 2.00% | 2.00% | 2.00% | 2.00% |
| G-2 | — | 2.00% | 2.00% | 2.00% | 2.00% | 2.00% | 2.00% |
| E | — | 0.50% | 0.50% | 0.50% | 0.50% | 0.50% | 0.50% |
| F | — | — | — | — | — | — | 3.00% |
| K-1 | — | — | — | 1.00% | 0.50% | 0.50% | 0.50% |
| K-2 | — | — | 1.00% | — | 0.50% | 0.50% | 0.50% |
| C1-4 | — | 3.00% | 3.00% | 3.00% | 3.00% | 3.00% | 2.00% |
| J | — | 0.50% | 0.50% | 0.50% | 0.50% | 0.50% | 0.50% |
| UL94V (1.6 mmt) | notV-2 | V-0 | V-0 | V-0 | V-0 | V-0 | V-0 |
| Izod Impact Strength (kJ/m$^2$) | 2.5 | 3.3 | 4.1 | 5.6 | 5.0 | 7.4 | 5.0 |
| Bending Strength (MPa) | — | 44.9 | 57.3 | 63.1 | 61.0 | 57.8 | 61.0 |
| Bending Elastic Modulus (GPa) | — | 4.3 | 3.8 | 3.7 | 3.3 | 3.0 | 3.3 |
| Bending Breaking Strain (%) | — | 1.6 | 5.8 | 7.3 | 7.7 | >10 | 7.7 |

As shown in Table 3, it was found from the results of Examples 4 to 8 that the polylactic acid resin compositions of the polylactic acid compound (PLA) blended with the amino group-containing polysiloxane compound (C1-4), the aliphatic polyester resin (PBSA), the carbodiimide compounds (K-1, 2) and the metal hydrate (1-2) surface-treated with an isocyanate silane coupling agent had a high flame retardancy of V-1 or higher and simultaneously were excellent in the impact strength and the bending breaking strain.

By contrast, it was found that Comparative Example 3 of the polylactic acid compound (PLA) singly was low in the flame retardancy and the impact strength. It was further found that Comparative Example 4, which contained no carbodiimide compound, was very low in the impact strength and the bending breaking strain.

TABLE 4

|  | Comparative Example 6 | Comparative Example 7 | Comparative Example 8 | Comparative Example 9 | Comparative Example 10 |
|---|---|---|---|---|---|
| PLA | 49.50% | 48.50% | 48.50% | 48.50% | 48.50% |
| PBSA | — | — | — | — | — |
| I-1 | — | — | — | — | 42.50% |
| I-2 | 42.50% | 42.50% | 42.50% | 42.50% | — |
| G-1 | 2.00% | 2.00% | 2.00% | 2.00% | 2.00% |
| G-2 | 2.00% | 2.00% | 2.00% | 2.00% | 2.00% |
| E | 0.50% | 0.50% | 0.50% | 0.50% | 0.50% |
| K-1 | — | 1.00% | — | 0.50% | 0.50% |
| K-2 | — | — | 1.00% | 0.50% | 0.50% |

TABLE 4-continued

|  | Comparative Example 6 | Comparative Example 7 | Comparative Example 8 | Comparative Example 9 | Comparative Example 10 |
|---|---|---|---|---|---|
| C1-4 | 3.00% | 3.00% | 3.00% | 3.00% | 3.00% |
| J | 0.50% | 0.50% | 0.50% | 0.50% | 0.50% |
| UL94V (1.6 mmt) | V-0 | V-0 | V-0 | V-0 | V-0 |
| Izod Impact Strength ($kJ/m^2$) | 1.8 | 2.6 | 1.6 | 2.8 | 1.9 |
| Bending Strength (MPa) | 60.6 | 75.2 | 62.5 | 72.3 | 66.5 |
| Bending Elastic Modulus (GPa) | 6.5 | 6.1 | 5.6 | 5.0 | 5.3 |
| Bending Breaking Strain (%) | 1.1 | 2.1 | 2.0 | 4.4 | 1.9 |

As shown in Table 4, it was found from the results of Comparative Examples 6 to 10 that the polylactic acid resin compositions containing no aliphatic polyester resin (PBSA), even if having a high flame retardancy of V-1 or higher, were very low in the impact strength and were inferior in practicability.

It was further found from the results of Comparative Example 9 and Comparative Example 10 that as seen in Comparative Example 10, the polylactic acid resin composition containing no aliphatic polyester resin (PBSA) and using the metal hydrate (I-1) non-surface-treated, though having a high flame retardancy of V-1 or higher, was very low in the impact strength and the bending breaking strain.

TABLE 5

|  | Example 9 | Example 10 | Example 11 | Comparative Example 11 | Comparative Example 12 |
|---|---|---|---|---|---|
| PLA | 38.80% | 38.80% | 38.80% | 48.50% | 48.50% |
| PBSA | 9.80% | 9.80% | 9.80% | — | — |
| I-3 | 42.50% | — | — | 42.50% | — |
| I-4 | — | 42.50% | — | — | 42.50% |
| I-5 | — | — | 42.50% | — | — |
| G-1 | 2.00% | 2.00% | 2.00% | 2.00% | 2.00% |
| G-2 | 2.00% | 2.00% | 2.00% | 2.00% | 2.00% |
| E | 0.50% | 0.50% | 0.50% | 0.50% | 0.50% |
| K-1 | 0.50% | 0.50% | 0.50% | 0.50% | 0.50% |
| K-2 | 0.50% | 0.50% | 0.50% | 0.50% | 0.50% |
| C1-4 | 3.00% | 3.00% | 3.00% | 3.00% | 3.00% |
| J | 0.50% | 0.50% | 0.50% | 0.50% | 0.50% |
| UL94V (1.6 mmt) | V-0 | V-0 | V-0 | V-0 | V-0 |
| Izod Impact Strength ($kJ/m^2$) | 6.3 | 9.2 | 4.0 | 3.3 | 3.3 |
| Bending Strength (MPa) | 63.0 | 61.4 | 48.9 | 76.1 | 75.5 |
| Bending Elastic Modulus (GPa) | 3.7 | 3.5 | 2.9 | 5.1 | 5.1 |
| Bending Breaking Strain (%) | 9.2 | >10 | 9.0 | 2.5 | 2.4 |

TABLE 6

|  | Example 13 | Example 14 | Example 15 |
|---|---|---|---|
| PLA | 36.00% | 36.80% | 39.2% |
| PBSA | 9.00% | 9.20% | 9.8% |
| I-2 | — | — | 40.0% |
| I-3 | 45.00% | 45.00% | — |
| G-1 | 2.00% | 2.00% | 2.00% |
| G-2 | 2.00% | 2.00% | 2.00% |
| E | 0.50% | 0.50% | 0.50% |
| F | 3.00% | 3.00% | 3.00% |
| K-1 | 0.50% | 0.50% | 0.50% |
| K-2 | 0.50% | 0.50% | 0.50% |
| C1-4 | 1.00% | 0.00% | 2.00% |
| J | 0.50% | 0.50% | 0.50% |
| UL94V (1.6 mmt) | V-0 | V-0 | V-0 |
| Izod Impact Strength ($kJ/m^2$) | 5.0 | 5.5 | 9.1 |
| Bending Strength (MPa) | 53.0 | 57.9 | 37.7 |
| Bending Elastic Modulus (GPa) | 3.0 | 3.8 | 2.0 |
| Bending Breaking Strain (%) | >10 | 9.5 | >10 |

As shown in Tables 5 and 6, it was found from the results of Examples 9 to 11 and Examples 13 to 15 that the polylactic acid resin compositions of the polylactic acid compound (PLA) blended with the amino group-containing polysiloxane compound (C1-4), the aliphatic polyester resin (PBSA), the carbodiimide compounds (K), and the metal hydrate (1-2) surface-treated with an isocyanate silane coupling agent, the metal hydrate (1-3) surface-treated with an aminosilane coupling agent, the metal hydrate (1-4) surface-treated with a ureidosilane coupling agent or the metal hydrate (I-5) surface-treated with an epoxysilane coupling agent had a high flame retardancy of V-1 or higher and simultaneously were excellent in the impact strength and the bending breaking strain.

By contrast, it was found from the results of Comparative Examples 11 and 12 that the polylactic acid resin compositions containing no aliphatic polyester resin (PBSA), even if having a high flame retardancy of V-1 or higher, were very low in the impact strength and the bending breaking strain and were inferior in practicability.

TABLE 7

|  | Comparative Example 13 | Comparative Example 14 | Comparative Example 15 | Comparative Example 16 | Comparative Example 17 |
|---|---|---|---|---|---|
| PLA | 38.80% | 33.95% | 38.80% | 38.80% | 38.80% |
| PBSA | 9.70% | 14.55% | 9.70% | 9.70% | 9.70% |
| I-1 | 42.50% | 42.50% | — | — | — |
| I-6 | — | — | 42.50% | — | — |
| I-7 | — | — | — | 42.50% | — |
| I-8 | — | — | — | — | 42.50% |
| G-1 | 2.00% | 2.00% | 2.00% | 2.00% | 2.00% |
| G-2 | 2.00% | 2.00% | 2.00% | 2.00% | 2.00% |
| E | 0.50% | 0.50% | 0.50% | 0.50% | 0.50% |
| K-1 | 0.50% | 0.50% | 0.50% | 0.50% | 0.50% |
| K-2 | 0.50% | 0.50% | 0.50% | 0.50% | 0.50% |
| C1-4 | 3.00% | 3.00% | 3.00% | 3.00% | 3.00% |
| J | 0.50% | 0.50% | 0.50% | 0.50% | 0.50% |
| UL94V(1.61 mmt) | V-0 | V-0 | V-0 | V-0 | V-0 |
| Izod Impact Strength (kJ/m$^2$) | 3.4 | 3.4 | 2.0 | 2.3 | 1.8 |
| Bending Strength (MPa) | 52.5 | 51.7 | 52.4 | 51.0 | 50.2 |
| Bending Elastic Modulus (GPa) | 3.8 | 3.2 | 3.2 | 3.1 | 3.0 |
| Bending Breaking Strain (%) | 3.4 | 3.5 | 2.4 | 2.5 | 2.2 |

As shown in Table 7 and Table 3, it was found from the results of Comparative Examples 13 to 17 and Examples 6 and 7 that the polylactic acid resin compositions of the polylactic acid compound (PLA) blended with the amino group-containing polysiloxane compound (C1-4), the aliphatic polyester resin (PBSA), the carbodiimide compounds (K), and the metal hydrate (I-1) non-surface-treated, the metal hydrate (I-6) surface-treated with a methacryloxysilane coupling agent, the metal hydrate (I-7) surface-treated with a vinylsilane coupling agent or the metal hydrate I-8) surface-treated with a stearic acid, even if having a high flame retardancy of V-1 or higher, were very low in the impact strength and the bending breaking strain and were inferior in practicability.

TABLE 8

|  | Example 16 | Example 17 | Example 18 | Example 19 | Example 20 | Example 21 | Example 22 |
|---|---|---|---|---|---|---|---|
| PLA | 36.80% | 36.00% | 35.20% | 31.60% | 31.20% | 31.60% | 27.30% |
| PBSA | 9.20% | 9.00% | 8.80% | 7.90% | 7.80% | — | — |
| PBSA-2 | — | — | — | — | — | 7.90% | 11.70% |
| I-3 | 45.00% | 45.00% | 45.00% | 45.00% | 45.00% | 45.00% | 45.00% |
| G-1 | 2.00% | 2.00% | 2.00% | 2.00% | 2.00% | 2.00% | 2.00% |
| G-2 | 2.00% | 2.00% | 2.00% | 2.00% | 2.00% | 2.00% | 2.00% |
| E | 0.50% | 0.50% | 0.50% | 0.50% | 0.50% | 0.50% | 0.50% |
| F | 3.00% | 3.00% | 3.00% | 3.00% | 3.00% | 3.00% | 3.00% |
| K-1 | 0.50% | 0.50% | 0.50% | 0.50% | 0.50% | 0.50% | 0.50% |
| K-2 | 0.50% | 0.50% | 0.50% | — | 0.50% | — | 0.50% |
| C1-4 | 0.00% | 1.00% | 2.00% | 2.00% | 2.00% | 2.00% | 2.00% |
| J | 0.50% | 0.50% | 0.50% | 0.50% | 0.50% | 0.50% | 0.50% |
| L | — | — | — | 5.00% | 5.00% | 5.00% | 5.00% |
| UL94V (1.6 mmt) | V-0 | V-0 | V-0 | V-0 | V-0 | V-0 | V-0 |
| UL94-5V (1.6 mmt) | not5VB | not5VB | 5VB | 5VB | 5VB | 5VB | 5VB |
| Deflection Temperature under Load [1.8 Mpa] (° C.) | not measured | 48 | 47 | 71 | 70 | 66 | not measured |
| Deflection Temperature under Load [0.45 MPa] (° C.) | not measured | not measured | not measured | 118 | 117 | 107 | not measured |

TABLE 8-continued

|  | Example 16 | Example 17 | Example 18 | Example 19 | Example 20 | Example 21 | Example 22 |
|---|---|---|---|---|---|---|---|
| Izod Impact Strength (kJ/m$^2$) | 5.2 | 5.4 | 5.5 | 6.5 | 5.2 | 7.3 | 9.8 |
| Bending Strength (MPa) | 57.2 | 52.2 | 58.0 | 57.2 | 54.3 | 53.0 | 54.5 |
| Bending Elastic Modulus (GPa) | 3.6 | 3.6 | 3.7 | 3.9 | 3.6 | 3.5 | 3.4 |
| Bending Breaking Strain (%) | 6.3 | 6.5 | 5.5 | 3.6 | 3.3 | 4.1 | 4.8 |

As shown in Table 8, it was found from the results of Examples 16 to 22 that the polylactic acid resin compositions of the polylactic acid compound (PLA) blended with the amino group-containing polysiloxane compound (C1-4), the aliphatic polyester resin (PBSA or PBSA-2), the carbodiimide compounds (K) and the metal hydrate (I-3) surface-treated with an aminosilane coupling agent had a high flame retardancy of V-1 or higher and simultaneously were excellent in the impact strength and the bending breaking strain.

It was further found from the results of Examples 18 to 22 that in the case where the blend amount of the amino group-containing polysiloxane compound (C1-4) was 2.0% or more, 5VB being higher flame retardancy was attained.

It was further found from comparison of the results of Example 18 with the results of Examples 19 to 22 that by blending the polylactic acid resin compositions of the polylactic acid compound (PLA) blended with the amino group-containing polysiloxane compound (C1-4), the aliphatic polyester resin (PBSA or PBSA-2), the carbodiimide compounds (K) and the metal hydrate (1-3) surface-treated with an aminosilane coupling agent, with the glass fiber, the polylactic acid resin composition had high flame retardancy of 5VB or higher and simultaneously was excellent in the impact strength and the bending breaking strain, and was improved in the deflection temperature under load.

Here, the addition of the glass fiber (L) was generally likely to improve the rigidity (elastic modulus), but is likely to reduce the bending breaking strain.

As shown in Table 8, it was found from the results of Examples 18 to 22 that the polyester resin compositions containing the polyester resin (the polylactic acid compound (A: PLA) and the aliphatic polyester resin (B: PBSA or PBSA-2))(P), the amino group-containing polysiloxane compound (C: C1-4), the phosphorus-containing flame retardants (G: G-1 and G-2), the metal hydrate (I: I-3) and the fluorine-containing polymer (J), and had a content of the amino group-containing polysiloxane compound (C: C1-4) of 1.5% by mass or higher was able to attain 5VB being high flame retardancy.

By contrast, the case (Example 16) of containing no amino group-containing polysiloxane compound (C: C1-4) and the case (Example 17) where the content of the amino group-containing polysiloxane compound (C: C1-4) was 1.0% by mass were not able to attain 5VB.

As shown in Table 8, it was further found from the results of Examples 18 to 22 that the case of using the metal hydrate (1-3) surface-treated with an aminosilane coupling agent as the metal hydrate (I) had high flame retardancy and simultaneously was excellent in the mechanical properties such as the impact strength and the bending breaking strain.

It was further found from comparison of the results of Example 18 with the results of Examples 19 to 22 that by blending the polyester resin composition (polylactic acid resin composition) further with the glass fiber (L), the compositions had high flame retardancy of 5VB or higher and simultaneously were excellent in the impact strength and the bending breaking strain, and were further improved in the deflection temperature under load.

TABLE 9

|  | Example 23 | Example 24 | Example 25 | Example 20 | Example 26 | Example 27 |
|---|---|---|---|---|---|---|
| PLA | 32.0% | 31.60% | 31.40% | 31.20% | 30.40% | 28.80% |
| PBSA | 8.00% | 7.90% | 7.80% | 7.80% | 7.60% | 7.20% |
| I-3 | 45.00% | 45.00% | 45.00% | 45.00% | 45.00% | 45.00% |
| G-1 | 2.00% | 2.00% | 2.00% | 2.00% | 2.00% | 2.00% |
| G-2 | 2.00% | 2.00% | 2.00% | 2.00% | 2.00% | 2.00% |
| E | 0.50% | 0.50% | 0.50% | 0.50% | 0.50% | 0.50% |
| F | 3.00% | 3.00% | 3.00% | 3.00% | 3.00% | 3.00% |
| K-1 | 0.50% | 0.50% | 0.50% | 0.50% | 0.50% | 0.50% |
| K-2 | 0.50% | 0.50% | 0.50% | 0.50% | 0.50% | 0.50% |
| C1-4 | 1.00% | 1.50% | 1.80% | 2.00% | 3.00% | 5.00% |
| J | 0.50% | 0.50% | 0.50% | 0.50% | 0.50% | 0.50% |
| L | 5.00% | 5.00% | 5.00% | 5.00% | 5.00% | 5.00% |
| UL94V (1.6 mmt) | V-0 | V-0 | V-0 | V-0 | V-0 | V-0 |
| UL94-5V (1.6 mmt) | Not 5VB | 5VB | 5VB | 5VB | 5VB | 5VB |
| Deflection Temperature under Load [1.8 Mpa] (° C.) | not measured | not measured | not measured | 70 | not measured | not measured |

TABLE 9-continued

| | Example 23 | Example 24 | Example 25 | Example 20 | Example 26 | Example 27 |
|---|---|---|---|---|---|---|
| Deflection Temperature under Load [0.45 MPa] (° C.) | not measured | not measured | not measured | 117 | not measured | not measured |
| Izod Impact Strength (kJ/m²) | 5.0 | 4.9 | 5.0 | 5.2 | 4.1 | 3.5 |
| Bending Strength (MPa) | 53.0 | 56.1 | 50.0 | 54.3 | 50.3 | 39.6 |
| Bending Elastic Modulus (GPa) | 3.0 | 4.2 | 4.0 | 3.6 | 3.7 | 3.3 |
| Bending Breaking Strain (%) | >10 | 3.2 | 2.5 | 3.3 | 3.2 | 2.6 |

As indicated by the results of Examples 23 to 25, 20 and 26 to 27, it was found that the case (Example 23) where the blend ratio of the amino group-containing polysiloxane compound (C)(C1-4: side-chain di-amino-type polysiloxane compound) was 1.0% by mass was not able to attain 5VB of flame retardancy, but the cases (Examples 24 to 25, 20, and 26 and 27) where the blend ratio was 1.5% by mass or higher was able to attain 5VB of flame retardancy. Here, it was found that the case (Example 27) where the blend ratio of the amino group-containing polysiloxane compound (C)(C1-4: side-chain di-amino-type polysiloxane compound) was relatively high was likely to reduce the impact strength and the bending strength.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

A part or the whole of the exemplary embodiments of the first means can be described also as the following exemplary embodiments, but is not limited to the following.

Further Exemplary Embodiment A1

A polylactic acid resin composition comprising a polylactic acid resin, an aliphatic polyester resin, a metal hydrate and a carbodiimide compound, wherein the metal hydrate is a metal hydrate surface-treated with an aminosilane coupling agent, a ureidosilane coupling agent, an isocyanate silane coupling agent or an epoxysilane coupling agent.

Further Exemplary Embodiment A2

The polylactic acid resin composition according to embodiment A1,
wherein the content of the polylactic acid resin is in the range of 25% by mass to 55% by mass with respect to the polylactic acid resin composition;
the content of the aliphatic polyester resin is in the range of 5% by mass to 20% by mass with respect to the polylactic acid resin composition;
the content of the metal hydrate is in the range of 30% by mass to 50% by mass with respect to the polylactic acid resin composition; and
the content of the carbodiimide compound is in the range of 0.5% by mass to 3% by mass with respect to the polylactic acid resin composition.

Further Exemplary Embodiment A3

The polylactic acid resin composition according to embodiment A2,
wherein the content of the polylactic acid resin is in the range of 25% by mass to 50% by mass with respect to the polylactic acid resin composition; and
the content of the aliphatic polyester resin is in the range of 5% by mass to 15% by mass with respect to the polylactic acid resin composition.

Further Exemplary Embodiment A4

The polylactic acid resin composition according to any one of embodiments A1 to A3, wherein the content of an alkali metal substance in the metal hydrate is 0.2% by mass or lower.

Further Exemplary Embodiment A5

The polylactic acid resin composition according to any one of embodiments A1 to A4, further comprising a phosphorus-containing flame retardant,
wherein the content of the phosphorus-containing flame retardant is in the range of 1% by mass to 15% by mass with respect to the polylactic acid resin composition.

Further Exemplary Embodiment A6

The polylactic acid resin composition according to any one of embodiments A1 to A5, further comprising a fluorine-containing polymer,
wherein the content of the fluorine-containing polymer is in the range of 0.1% by mass to 5% by mass with respect to the polylactic acid resin composition.

Further Exemplary Embodiment A7

The polylactic acid resin composition according to any one of embodiments A1 to A4, further comprising an amino group-containing polysiloxane compound having an amino group in a side chain thereof mixed in the composition.

Further Exemplary Embodiment A8

The polylactic acid resin composition according to embodiment A7, wherein the blend amount of the amino group-containing polysiloxane compound is in the range of 1.5% by mass to 5% by mass with respect to the polylactic acid resin composition.

Further Exemplary Embodiment A9

The polylactic acid resin composition according to embodiment A7 or A8, wherein the polylactic acid resin is a polylactic acid resin obtained by mixing the amino group-containing polysiloxane compound with a polylactic acid compound, wherein the content of the amino group is in the range of 0.01 to 2.5% by mass with respect to the amino group-containing polysiloxane compound; and the content of the amino group is in the range of 3 ppm by mass to 300 ppm by mass with respect to the polylactic acid compound.

Further Exemplary Embodiment A10

The polylactic acid resin composition according to any one of embodiments A7 to A9, further comprising a phosphorus-containing flame retardant and a fluorine-containing polymer, wherein the content of the phosphorus-containing flame retardant is in the range of 1% by mass to 15% by mass with respect to the polylactic acid resin composition; and the content of the fluorine-containing polymer is in the range of 0.1% by mass to 5% by mass with respect to the polylactic acid resin composition.

Further Exemplary Embodiment A11

The polylactic acid resin composition according to embodiment A10, wherein the content of the phosphorus-containing flame retardant is in the range of 2% by mass to 10% by mass with respect to the polylactic acid resin composition; and the content of the fluorine-containing polymer is in the range of 0.2% by mass to 2% by mass with respect to the polylactic acid resin composition.

Further Exemplary Embodiment A12

The polylactic acid resin composition according to any one of embodiments A1 to A11, further comprising a crystal nucleating agent, wherein the content of the crystal nucleating agent is in the range of 0.2% by mass to 2% by mass with respect to the polylactic acid resin composition.

Further Exemplary Embodiment A13

The polylactic acid resin composition according to any one of embodiments A1 to A12, further comprising a plasticizer, wherein the content of the plasticizer is in the range of 0.5% by mass to 5% by mass with respect to the polylactic acid resin composition.

Further Exemplary Embodiment A14

The polylactic acid resin composition according to any one of embodiments A1 to A13, further comprising a glass fiber, wherein the content of the glass fiber is in the range of 1% by mass to 10% by mass with respect to the polylactic acid resin composition.

Further Exemplary Embodiment A15

A molded body formed by using a polylactic acid resin composition according to any one of embodiments A1 to A14.

Further Exemplary Embodiment A16

A method for producing a polylactic acid resin composition, comprising a step of mixing and stirring a mixture in a melt state comprising a polylactic acid resin, an aliphatic polyester resin, a carbodiimide compound, and a metal hydrate, wherein the metal hydrate is a metal hydrate surface-treated with an aminosilane coupling agent, a ureidosilane coupling agent, an isocyanate silane coupling agent or an epoxysilane coupling agent.

Further Exemplary Embodiment A17

The method for producing a polylactic acid resin composition according to embodiment A16, further comprising adding an amino group-containing polysiloxane compound having an amino group in a side chain thereof, a phosphorus-containing flame retardant and a fluorine-containing polymer, wherein the content of the polylactic acid resin is in the range of 25% by mass to 55% by mass with respect to the polylactic acid resin composition;

the content of the aliphatic polyester resin is in the range of 5% by mass to 20% by mass with respect to the polylactic acid resin composition;

the content of the metal hydrate is in the range of 30% by mass to 50% by mass with respect to the polylactic acid resin composition;

the content of the carbodiimide compound is in the range of 0.5% by mass to 3% by mass with respect to the polylactic acid resin composition;

the content of the amino group-containing polysiloxane compound is in the range of 1.5% by mass to 5% by mass with respect to the polylactic acid resin composition;

the content of the phosphorus-containing flame retardant is in the range of 1% by mass to 15% by mass with respect to the polylactic acid resin composition; and the content of the fluorine-containing polymer is in the range of 0.1% by mass to 5% by mass with respect to the polylactic acid resin composition.

Further Exemplary Embodiment A18

The method for producing a polylactic acid resin composition according to embodiment A17, wherein the content of the phosphorus-containing flame retardant is in the range of 2% by mass to 10% by mass with respect to the polylactic acid resin composition; and the content of the fluorine-containing polymer is in the range of 0.2% by mass to 2% by mass with respect to the polylactic acid resin composition.

Further Exemplary Embodiment A19

The method for producing a polylactic acid resin composition according to embodiment A17 or A18,
wherein the polylactic acid resin is a polylactic acid resin obtained by mixing the amino group-containing polysiloxane compound and a polylactic acid compound,
wherein the content of the amino group is in the range of 0.01 to 2.5% by mass with respect to the amino group-containing polysiloxane compound; and
the content of the amino group is in the range of 3 ppm by mass to 300 ppm by mass with respect to the polylactic acid compound.

Further Exemplary Embodiment A20

A polylactic acid resin composition comprising a polylactic acid resin, an aliphatic polyester resin, a metal hydrate and a carbodiimide compound,
wherein the metal hydrate is a metal hydrate surface-treated with an aminosilane coupling agent, a ureidosilane coupling agent, an isocyanate silane coupling agent or an epoxysilane coupling agent,
wherein the polylactic acid resin is a polylactic acid resin obtained by mixing an amino group-containing polysiloxane compound having an amino group in a side chain thereof with a polylactic acid compound,
wherein the content of the amino group of the amino group-containing polysiloxane compound is in the range of 0.01 to 2.5% by mass with respect to the amino group-containing polysiloxane compound; and
the content of the amino group of the amino group-containing polysiloxane compound is in the range of 3 ppm by mass to 300 ppm by mass with respect to the polylactic acid compound.

Further Exemplary Embodiment A21

A polylactic acid resin composition according to embodiment A20, further comprising a phosphorus-containing flame retardant and a fluorine-containing polymer.

Further Exemplary Embodiment A22

The polylactic acid resin composition according to any one of embodiments A7 to A11 and A20 to A21, wherein the amino group-containing polysiloxane compound comprises at least one of a compound represented by the following formula (1) and a compound represented by the following formula (2).

[Formula 7]

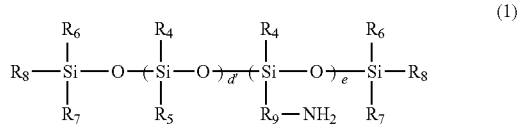

(1)

[Formula 8]

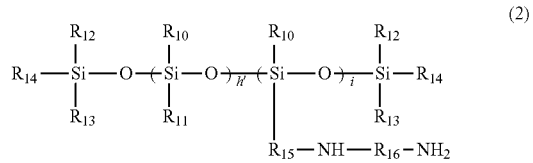

(2)

wherein in the formulae (1) and (2), $R_4$ to $R_8$ and $R_{10}$ to $R_{14}$ each independently denote an alkyl group, alkenyl group, aryl group, aralkyl group or alkylaryl group each having 18 or less carbon atoms, or $-(CH_2)_\alpha-NH-C_6H_5$ ($\alpha$ is an integer of 1 to 8), and these may be fully or partially substituted with a halogen atom(s); $R_9$, $R_{15}$ and $R_{16}$ each independently denote a divalent organic group; and d' and h' each denote an integer of 0 or more, and e and i each denote an integer of 1 or more.

A part or the whole of the exemplary embodiments of the second means can be described also as the following exemplary embodiments, but is not limited to the following.

Further Exemplary Embodiment B1

A polyester resin composition comprising a polysiloxane-mixed polyester resin (R) comprising a polyester compound (P) and an amino group-containing polysiloxane compound (C) mixed, a phosphorus-containing flame retardant (G), a metal hydrate (I), and a fluorine-containing polymer (J),
wherein the content of the polyester compound (P) is in the range of 30 to 65% by mass with respect to the polyester resin composition;
the content of the amino group-containing polysiloxane compound (C) is in the range of 1.5 to 10% by mass with respect to the polyester resin composition;
the content of the phosphorus-containing flame retardant (G) is in the range of 1 to 20% by mass with respect to the polyester resin composition;
the content of the metal hydrate (I) is in the range of 30 to 60% by mass with respect to the polyester resin composition; and
the content of the fluorine-containing polymer (J) is in the range of 0.1 to 5% by mass with respect to the polyester resin composition.

Further Exemplary Embodiment B2

The polyester resin composition according to embodiment B1, wherein the polyester compound (P) comprises a polylactic acid compound (A) and an aliphatic polyester resin (B).

Further Exemplary Embodiment B3

The polyester resin composition according to embodiment B2,
wherein the content of the polylactic acid compound (A) is in the range of 25 to 55% by mass with respect to the polyester resin composition; and
the content of the aliphatic polyester resin (B) is in the range of 5 to 20% by mass with respect to the polyester resin composition.

Further Exemplary Embodiment B4

The polyester resin composition according to embodiment B2 or B3,
wherein the content of the amino group of the amino group-containing polysiloxane compound (C) is in the range of 0.01 to 2.5% by mass with respect to the amino group-containing polysiloxane compound (C); and
the content of the amino group of the amino group-containing polysiloxane compound (C) is in the range of 3 to 300 ppm by mass with respect to the polylactic acid compound (A).

Further Exemplary Embodiment B5

The polyester resin composition according to any one of embodiments B1 to B3,
wherein the content of the amino group of the amino group-containing polysiloxane compound (C) is in the range of 0.01 to 2.5% by mass with respect to the amino group-containing polysiloxane compound (C).

Further Exemplary Embodiment B6

A polyester resin composition comprising a polysiloxane-mixed polyester resin (R)
obtained by mixing a polyester compound (P) and an amino group-containing polysiloxane compound (C), a phosphorus-containing flame retardant (G), a metal hydrate (I), and a fluorine-containing polymer (J),
wherein the polyester compound (P) comprises a polylactic acid compound (A) and an aliphatic polyester resin (B),
wherein the blend amount of the amino group-containing polysiloxane compound (C) is 1.5 to 10% by mass with respect to the polyester resin composition; and
the content of the amino group of the amino group-containing polysiloxane compound (C) is in the range of 0.01 to 2.5% by mass with respect to the amino group-containing polysiloxane compound (C); and
the content of the amino group of the amino group-containing polysiloxane compound (C) is in the range of 3 to 300 ppm by mass with respect to the polylactic acid compound (A).

Further Exemplary Embodiment B7

The polyester resin composition according to any one of embodiments B1 to B6, wherein the amino group-containing polysiloxane compound (C) is a polysiloxane compound having an amino group in a side chain thereof.

Further Exemplary Embodiment B8

The polyester resin composition according to any one of embodiments B1 to B7, wherein the amino group-containing polysiloxane compound (C) comprises at least one of a compound represented by the following formula (1) and a compound represented by the following formula (2).

[Formula 9]

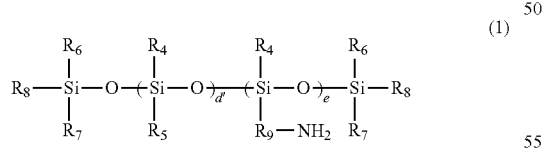

(1)

[Formula 10]

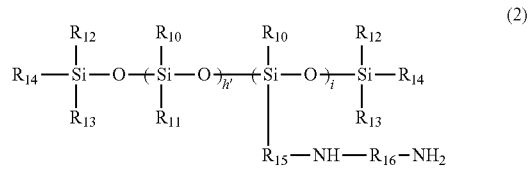

(2)

In the formulae (1) and (2), $R_4$ to $R_8$ and $R_{10}$ to $R_{14}$ each independently denote an alkyl group, alkenyl group, aryl group, aralkyl group or alkylaryl group each having 18 or less carbon atoms, or $-(CH_2)_\alpha-NH-C_6H_5$ ($\alpha$ is an integer of 1 to 8), and these may be fully or partially substituted with a halogen atom(s); $R_9$, $R_{15}$ and $R_{16}$ each independently denote a divalent organic group; and d' and h' each denote an integer of 0 or more, and e and i each denote an integer of 1 or more.

Further Exemplary Embodiment B9

The polyester resin composition according to any one of embodiments B1 to B8, wherein the metal hydrate is a metal hydrate surface-treated with an aminosilane coupling agent, a ureidosilane coupling agent, an isocyanate silane coupling agent or an epoxysilane coupling agent.

Further Exemplary Embodiment B10

The polyester resin composition according to any one of embodiments B1 to B9, wherein the content of an alkali metal substance in the metal hydrate (I) is 0.2% by mass or lower.

Further Exemplary Embodiment B11

The polyester resin composition according to any one of embodiments B1 to B10, further comprising a carbodiimide compound,
wherein the content of the carbodiimide compound is in the range of 0.5 to 3% by mass with respect to the polyester resin composition.

Further Exemplary Embodiment B12

The polyester resin composition according to any one of embodiments B1 to B11, further comprising a crystal nucleating agent,
wherein the content of the crystal nucleating agent is in the range of 0.2 to 2% by mass with respect to the polyester resin composition.

Further Exemplary Embodiment B13

The polyester resin composition according to any one of embodiments B1 to B12, further comprising a plasticizer,
wherein the content of the plasticizer is in the range of 0.5 to 5% by mass with respect to the polyester resin composition.

Further Exemplary Embodiment B14

The polyester resin composition according to any one of embodiments B1 to B13, further comprising a glass fiber,
wherein the content of the glass fiber is in the range of 1 to 10% by mass with respect to the polyester resin composition.

Further Exemplary Embodiment B15

A molded body formed by using a polyester resin composition according to any one of embodiments B1 to B14.

Further Exemplary Embodiment B16

A method for producing a polyester resin composition comprising a polysiloxane-mixed polyester resin (R) comprising a polyester compound (P) and an amino group-containing polysiloxane compound (C) mixed, a phosphorus-containing flame retardant (G), a metal hydrate (I), and a fluorine-containing polymer (J), the method comprising a step of mixing and stirring a mixture in a melt state of the polyester compound (P), the amino group-containing polysiloxane compound (C), the phosphorus-containing flame retardant (G), the metal hydrate (I), and the fluorine-containing polymer (J), wherein the blend amount of the polyester compound (P) is in the range of 30 to 65% by mass with respect to the polyester resin composition;

the blend amount of the amino group-containing polysiloxane compound (C) is in the range of 1.5 to 10% by mass with respect to the polyester resin composition;

the blend amount of the phosphorus-containing flame retardant (G) is in the range of 1 to 20% by mass with respect to the polyester resin composition;

the blend amount of the metal hydrate (I) is in the range of 30 to 60% by mass with respect to the polyester resin composition; and the blend amount of the fluorine-containing polymer (J) is in the range of 0.1 to 5% by mass with respect to the polyester resin composition.

Further Exemplary Embodiment B17

The method for producing a polyester resin composition according to embodiment B16, wherein the polyester compound (P) comprises a polylactic acid compound (A) and an aliphatic polyester resin (B), wherein the content of the polylactic acid compound (A) is in the range of 25 to 55% by mass with respect to the polyester resin composition; and the content of the aliphatic polyester resin (B) is in the range of 5 to 20% by mass with respect to the polyester resin composition.

Further Exemplary Embodiment B18

The method for producing a polyester resin composition according to embodiment B17, wherein the content of the amino group of the amino group-containing polysiloxane compound (C) is in the range of 0.01 to 2.5% by mass with respect to the amino group-containing polysiloxane compound (C); and the content of the amino group of the amino group-containing polysiloxane compound (C) is in the range of 3 to 300 ppm by mass with respect to the polylactic acid compound (A).

Further Exemplary Embodiment B19

The method for producing a polyester resin composition according to embodiment B16 or B17, wherein the content of the amino group of the amino group-containing polysiloxane compound (C) is in the range of 0.01 to 2.5% by mass with respect to the amino group-containing polysiloxane compound (C)

Further Exemplary Embodiment B20

The method for producing a polyester resin composition according to any one of embodiments B16 to B19, wherein the amino group-containing polysiloxane compound is a polysiloxane compound having an amino group in a side chain thereof.

INDUSTRIAL APPLICABILITY

As described hitherto, the polylactic acid resin compositions according to the exemplary embodiments of the first means of the present invention have high flame retardancy and excellent impact resistance and flexibility. Further the polyester resin compositions according to the exemplary embodiments of the second means of the present invention have higher flame retardancy. Applications of the polylactic acid resin compositions and the polyester resin compositions according to the exemplary embodiments of the present invention are not especially limited, and these can be broadly applied, for example, to housings of household appliances and OA devices, car trim parts, and the like.

The invention claimed is:

1. A polyester resin composition, comprising: a polysiloxane-mixed polyester resin (R) comprising a polyester compound (P) and an amino group-containing polysiloxane compound (C) mixed; a phosphorus-containing flame retardant (G); a metal hydrate (I); and a fluorine-containing polymer (J), wherein the polyester compound (P) comprises a polylactic acid compound (A) and an aliphatic polyester resin (B);

a content of the polylactic acid compound (A) is in a range of 25 to 55% by mass with respect to the polyester resin composition;

a content of the aliphatic polyester resin (B) is in a range of 5 to 20% by mass with respect to the polyester resin composition;

a content of the polyester compound (P) is in the range of 30 to 65% by mass with respect to the polyester resin composition;

a content of the amino group-containing polysiloxane compound (C) is in the range of 1.5 to 10% by mass with respect to the polyester resin composition;

a content of the phosphorus-containing flame retardant (G) is in the range of 1 to 20% by mass with respect to the polyester resin composition;

a content of the metal hydrate (I) is in the range of 30 to 60% by mass with respect to the polyester resin composition; and a content of the fluorine-containing polymer (J) is in the range of 0.1 to 5% by mass with respect to the polyester resin composition.

2. The polyester resin composition according to claim 1, wherein a content of the amino group of the amino group-containing polysiloxane compound (C) is in the range of 0.01 to 2.5% by mass with respect to the amino group-containing polysiloxane compound (C); and a content of the amino group of the amino group-containing polysiloxane compound (C) is in the range of 3 to 300 ppm by mass with respect to the polylactic acid compound (A).

3. A polyester resin composition, comprising: a polysiloxane-mixed polyester resin (R) obtained by mixing a polyester compound (P) and an amino group-containing polysiloxane compound (C); a phosphorus-containing flame retardant (G); a metal hydrate (I); and a fluorine-containing polymer (J), wherein the polyester compound (P) comprises a polylactic acid compound (A) and an aliphatic polyester resin (B), a content of the polylactic acid compound (A) is in a range of 25 to 55% by mass with respect to the polyester resin composition;

a content of the aliphatic polyester resin (B) is in a range of 5 to 20% by mass with respect to the polyester resin composition;

a blend amount of the amino group-containing polysiloxane compound (C) is 1.5 to 10% by mass with respect to the polyester resin composition; and a content of the amino group of the amino group-containing polysiloxane compound (C) is in the range of 0.01 to 2.5% by mass with respect to the amino group-containing polysiloxane compound (C);

a content of the amino group of the amino group-containing polysiloxane compound (C) is in the range of 3 to 300 ppm by mass with respect to the polylactic acid compound (A);

a content of the phosphorus-containing flame retardant (G) is in a range of 1 to 20% by mass with respect to the polyester resin composition;

a content of the metal hydrate (I) is in a range of 30 to 60% by mass with respect to the polyester resin composition; and a content of the fluorine-containing polymer (J) is in a range of 0.1 to 5% by mass with respect to the polyester resin composition.

4. The polyester resin composition according to claim 1, wherein the amino group-containing polysiloxane compound (C) comprises at least one of a compound represented by the following formula (1) and a compound represented by the following formula (2):

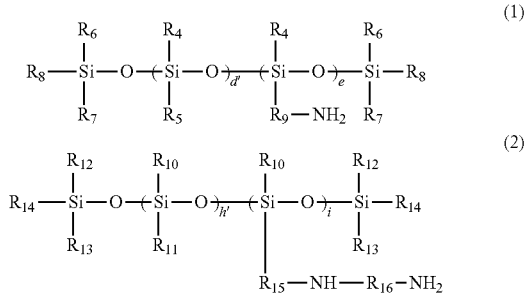

wherein $R_4$ to $R_8$ and $R_{10}$ to $R_{14}$ each independently denote an alkyl group, alkenyl group, aryl group, aralkyl group or alkylaryl group each having 18 or less carbon atoms, or $-(CH_2)_\alpha-NH-C_6H_5$ ($\alpha$ is an integer of 1 to 8), and these may be fully or partially substituted with a halogen atom(s); $R_9$, $R_{15}$ and $R_{16}$ each independently denote a divalent organic group; and d' and h' each denote an integer of 0 or more, and e and i each denote an integer of 1 or more.

5. The polyester resin composition according to claim 1, further comprising: a carbodiimide compound; a crystal nucleating agent; and a plasticizer, wherein a content of the carbodiimide compound is in the range of 0.5 to 3% by mass with respect to the polyester resin composition;

a content of the crystal nucleating agent is in the range of 0.2 to 2% by mass with respect to the polyester resin composition; and a content of the plasticizer is in the range of 0.5 to 5% by mass with respect to the polyester resin composition.

6. The polyester resin composition according to claim 1, further comprising a glass fiber, wherein a content of the glass fiber is in the range of 1 to 10% by mass with respect to the polyester resin composition.

7. A molded body formed by using the polyester resin composition according to claim 1.

8. A method for producing a polyester resin composition, the composition comprising: a polysiloxane-mixed polyester resin (R) comprising a polyester compound (P) and an amino group-containing polysiloxane compound (C) mixed; a phosphorus-containing flame retardant (G); a metal hydrate (I); and a fluorine-containing polymer (J), the method comprising a step of mixing and stirring a mixture in a melt state of the polyester compound (P), the amino group-containing polysiloxane compound (C), the phosphorus-containing flame retardant (G), the metal hydrate (I), and the fluorine-containing polymer (J), wherein the polyester compound (P) comprises a polylactic acid compound (A) and an aliphatic polyester resin (B);

a content of the polylactic acid compound (A) is in a range of 25 to 55% by mass with respect to the polyester resin composition;

a content of the aliphatic polyester resin (B) is in a range of 5 or 20% by mass with respect to the polyester resin composition;

a blend amount of the polyester compound (P) is in the range of 30 to 65% by mass with respect to the polyester resin composition;

a blend amount of the amino group-containing polysiloxane compound (C) is in the range of 1.5 to 10% by mass with respect to the polyester resin composition;

a blend amount of the phosphorus-containing flame retardant (G) is in the range of 1 to 20% by mass with respect to the polyester resin composition;

a blend amount of the metal hydrate (I) is in the range of 30 to 60% by mass with respect to the polyester resin composition; and a blend amount of the fluorine-containing polymer (J) is in the range of 0.1 to 5% by mass with respect to the polyester resin composition.

9. The polyester resin composition according to claim 1, wherein the metal hydrate (I) is at least one selected from the group consisting of aluminum hydroxide, magnesium hydroxide, dawsonite, calcium aluminate, hydrated gypsum, calcium hydroxide, zinc borate, barium metaborate, borax, kaolin clay, and calcium carbonate.

10. The polyester resin composition according to claim 3, wherein the metal hydrate (I) is at least one selected from the group consisting of aluminum hydroxide, magnesium hydroxide, dawsonite, calcium aluminate, hydrated gypsum, calcium hydroxide, zinc borate, barium metaborate, borax, kaolin clay, and calcium carbonate.

11. The method according to claim 8, wherein the metal hydrate (I) is at least one selected from the group consisting of aluminum hydroxide, magnesium hydroxide, dawsonite, calcium aluminate, hydrated gypsum, calcium hydroxide, zinc borate, barium metaborate, borax, kaolin clay, and calcium carbonate.

* * * * *